United States Patent
Linden et al.

(10) Patent No.: US 10,380,672 B2
(45) Date of Patent: Aug. 13, 2019

(54) SYSTEMS AND METHODS FOR USING A SOCIAL NETWORKING SYSTEM TO PURCHASE PRODUCTS

(71) Applicant: Facebook, Inc., Menlo Park, CA (US)

(72) Inventors: Lee Charles Linden, San Francisco, CA (US); Benjamin Lewis, San Francisco, CA (US); Deborah Liu, Palo Alto, CA (US); Mary Ku, San Jose, CA (US); Stephanie Shum, Sunnyvale, CA (US); Neville S. Bowers, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 418 days.

(21) Appl. No.: 14/279,062

(22) Filed: May 15, 2014

(65) Prior Publication Data
US 2015/0100458 A1    Apr. 9, 2015

Related U.S. Application Data

(60) Provisional application No. 61/887,306, filed on Oct. 4, 2013.

(51) Int. Cl.
*G06Q 30/00* (2012.01)
*G06Q 30/06* (2012.01)
*G06Q 50/00* (2012.01)

(52) U.S. Cl.
CPC ......... *G06Q 30/0633* (2013.01); *G06Q 50/01* (2013.01)

(58) Field of Classification Search
CPC ..... G06Q 30/0601–0645; G06Q 30/08; G06Q 30/0633; G06Q 50/01
USPC ................................................ 705/26.1–27.2
See application file for complete search history.

(56) References Cited

U.S. PATENT DOCUMENTS

| | | | |
|---|---|---|---|
| 8,185,558 B1 * | 5/2012 | Narayanan | G06F 17/30958 707/798 |
| 8,438,079 B1 | 5/2013 | Nguyen et al. | |
| 8,689,124 B2 | 4/2014 | Amacker | |
| 9,218,613 B2 | 12/2015 | Dinardo et al. | |
| 9,779,459 B2 * | 10/2017 | Biltz | G06Q 50/01 |
| 2008/0154720 A1 | 6/2008 | Gounares et al. | |
| 2009/0282144 A1 | 11/2009 | Sherrets | |
| 2009/0299878 A1 | 12/2009 | Keresman, III et al. | |

(Continued)

FOREIGN PATENT DOCUMENTS

| | | |
|---|---|---|
| KR | 10-2006-0068368 | 6/2006 |
| WO | WO 2009-067244 | 5/2009 |

OTHER PUBLICATIONS

Nam, Hyoryung: "Marketing Applications of Social Tagging Networks," UMI Dissertation Publishing, ProQuest Dialog #1199346200, 149 pgs. (Year: 2012).*

(Continued)

*Primary Examiner* — Robert M Pond
(74) *Attorney, Agent, or Firm* — Keller Jolley Preece

(57) ABSTRACT

Embodiments of the present invention relate generally to marketing products through a social networking system. More specifically, one or more embodiments of the present invention relate to allowing social networking users to purchase products through the social networking system and to add products to shopping carts associated with third-party merchants.

20 Claims, 20 Drawing Sheets

(56) References Cited

U.S. PATENT DOCUMENTS

| | | | |
|---|---|---|---|
| 2010/0185525 A1* | 7/2010 | Hazen | G06Q 10/087 |
| | | | 705/26.1 |
| 2011/0093361 A1 | 4/2011 | Morales | |
| 2012/0001919 A1* | 1/2012 | Lumer | G06F 17/30705 |
| | | | 345/440 |
| 2012/0078766 A1 | 3/2012 | Rose et al. | |
| 2013/0103584 A1 | 4/2013 | Eichner et al. | |
| 2013/0166653 A1 | 6/2013 | Sherrets et al. | |
| 2013/0212177 A1 | 8/2013 | Friedman | |
| 2013/0246225 A1* | 9/2013 | Biltz | G06Q 50/01 |
| | | | 705/27.1 |
| 2013/0290149 A1* | 10/2013 | Rashwan | G06Q 30/0641 |
| | | | 705/27.1 |
| 2014/0136346 A1* | 5/2014 | Teso | G06Q 30/06 |
| | | | 705/14.72 |
| 2014/0172965 A1* | 6/2014 | Yerli | G06Q 50/01 |
| | | | 709/204 |

OTHER PUBLICATIONS

U.S. Appl. No. 61/887,306, filed Oct. 4, 2013, Linden.
International Search Report issued in PCT/US2014/039200 dated Oct. 8, 2014.
U.S. Appl. No. 14/037,357, filed Sep. 25, 2013, Vernal.
U.S. Appl. No. 14/284,250, filed May 21, 2014, Linden.
International Search Report issued in PCT/US2013/061856 dated May 19, 2014.
U.S. Appl. No. 14/284,250, Jul. 27, 2018, Office Action.
U.S. Appl. No. 14/284,250, Nov. 30, 2017, Office Action.
Office Action as received in Japanese application 2016-518204 dated May 29, 2018.
U.S. Appl. No. 14/284,250, dated Mar. 22, 2019, Office Action.

* cited by examiner

800 search iPad 2  [Want] [Recommend] [Like]

Consumer Electronics --> Computer --> Tablets

Manufactured by Apple

About

The all-new thinner and lighter design makes iPad 2 even more comfortable to hold. It's even more powerful with the dual-core A5 Chip, yet has the same 10 hours of battery life. 1 With two cameras, you can make FaceTime video calls, 2 record HD video and put a twist on your snapshots in Photo Booth. And the iPad Smart Cover attaches magnetically and wakes up, stands up and brightens up you iPad 2.3

| Image 1 | Image 2 | Image 3 | Image 4 | Image 5 |

Where to Buy

16GB Black

[Apple Store] [Best Buy] [Target] [Walmart] [Buy.com]

2,560,543 want this
1,332,902 recommend this
465,900 own this

Where to buy
Manufacture

Home   Profile   Account

Create A Product Page —802

You and iPad 2

12 friends want this 12 friends recommend this

Upcoming Birthdays

Brynn Shepard's Birthday today
Write on wall - See wishlist

*Fig. 8*

SYSTEMS AND METHODS FOR USING A SOCIAL NETWORKING SYSTEM TO PURCHASE PRODUCTS

CROSS REFERENCE TO RELATED APPLICATIONS

This application claims priority to and the benefit of U.S. Provisional Patent App. No. 61/887,306 filed Oct. 4, 2013, the entirety of which is hereby incorporated by reference. This application also relates to U.S. application Ser. No. 14/037,357 titled "Dynamically Providing a Third-Party Checkout Option," filed Sep. 25, 2013, the entirety of which is hereby incorporated by reference.

BACKGROUND OF THE INVENTION

1. The Field of the Invention

Embodiments of the present invention relate generally to marketing through a social networking system. More specifically, one or more embodiments of the present invention relate to allowing social networking users to purchase products through the social networking system or to add products to shopping carts of third-party merchants.

2. Background and Relevant Art

An increasing amount of commerce is originating from social networking activity. For example, social networking systems (such as, for example, the social networking system provided by Facebook, Inc.(™)) are providing a valuable platform through which merchants can market their products (e.g., goods and services), as well as promote their physical (e.g., brick and mortar) and virtual (e.g., websites and mobile applications) retail. Social networking systems provide value to merchants in a number of ways. For example, social networking systems can facilitate a viral spread commerce activity among users, thereby increasing market presence of a product without direct action by a merchant providing the product. Furthermore, users of social networking systems provide user-specific information to the social networking system that can be used to provide highly-tailored advertisements and other marketing content to the users, thereby increasing purchase conversion percentages for merchants and increasing the effectiveness of marketing activities.

Despite the many advantages of using social networking systems for commerce, marketing products through social networking systems still suffers from one or more disadvantages. Primarily, users of a social networking system that are interested in purchasing or investigating a product made known to them through a social networking system, are typically required to shift their focus away from the social networking system or a corresponding application (e.g., a mobile social networking application or a web-based social networking application) in order to obtain additional information regarding the product or to purchase the product. For example, a user viewing a product advertisement provided through a social networking system (e.g., within the user's social networking news feed), may be required to shift their focus to a separate website or application in order to learn more about the advertised product or initiate a purchase of the product. This can be disruptive to the user's experience on the social networking system and may discourage the user from taking any action with respect to the advertised product. Furthermore, if a user is interested in the product, but does not want to immediately shift focus away from the social networking system, the user's interest in the product may fade or the user may forget about the product entirely before the user takes any action with respect to the product.

These and other disadvantages may exist with respect to commerce facilitated by way of a social networking system or service.

BRIEF SUMMARY OF THE INVENTION

Embodiments of the present invention provide benefits and/or solve one or more of the foregoing or other problems in the art with methods and systems for commerce activities associated with social network systems. In particular, the methods and systems disclosed herein allow a user of a social networking system to perform one or more commerce activities (e.g., add a product to a virtual shopping cart or purchase a product) without disrupting the user's social networking experience.

In some embodiments, a social networking system server or application (e.g., a native social networking application of a user device) causes a product to be added to a third party merchant's shopping cart. Information regarding a product available through a third-party merchant is associated with a product node within the social networking system. A communication (e.g., an advertisement or other post), including the information regarding the product, is provided to a user of the social networking system (e.g., by way of a native or web-based social networking application). It may be that the product is tagged in the communication. A selectable option (e.g., a user-interface control) to add the product to a shopping cart associated with a third-party merchant is provided in conjunction with the communication. If the user chooses the selectable option, a request to add the product to the user's virtual shopping cart is sent to the third-party merchant without redirecting the user away from the social networking system. Accordingly, a user can add a product to the user's shopping cart for a separate third-party merchant (e.g., for later purchase) without shifting focus away from the social networking system.

In other embodiments, a social networking system server may facilitate purchase of a product by a user directly through the social networking system. Information regarding a product available through a social networking system is associated with a product node within the social networking system. A communication (e.g., an advertisement or other post), including the information regarding the product, is provided to a user of the social networking system (e.g., by way of a native or web-based social networking application). It may be that the product is tagged in the communication. A selectable option (e.g., a user-interface control) to purchase the product directly through the social networking system is provided in conjunction with the communication. If the user chooses the selectable option, the social networking system initiates the purchase of the product without redirecting the user to a separate commerce application or system. Accordingly, a user can purchase a product from a social networking system without shifting focus away from the social networking system.

The one or more embodiments disclosed herein help improve a user's social networking experience while still facilitating one or more commerce activities of the user. In particular, products can be purchased and/or saved for purchase at a later time without a user having to shift focus from a social networking system over to a commerce application of a third-party merchant.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the invention. Such notation, however, should not be taken to mean that these are the only options or optional operations, and/or that blocks with solid borders are not optional in certain embodiments of the invention. Understanding that these drawings depict only typical embodiments of the invention and are not therefore to be considered to be limiting of its scope, the invention will be described and explained with additional specificity and detail through the use of the accompanying drawings in which:

FIG. 8 illustrates an example graphical user interface including information and content from a product node in accordance with principles described herein;

DETAILED DESCRIPTION

Figure 1:
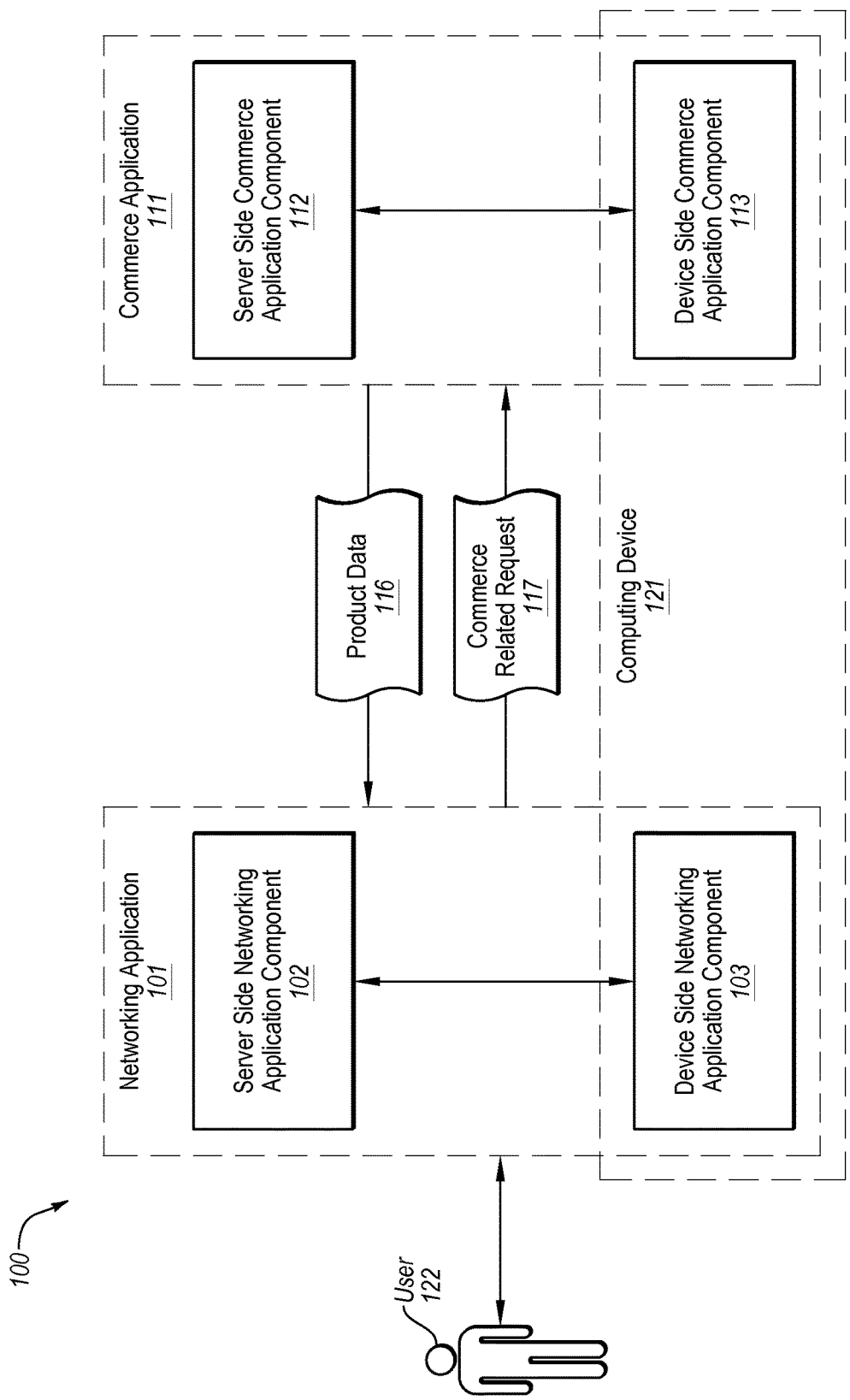
FIG. 1 illustrates a schematic diagram of a system in accordance with principles described herein.

One or more embodiments of the present invention help improve user experience and sales conversions related to commerce activities on a social networking system. In particular, methods and systems disclosed herein allow a user of a social networking system to perform one or more commerce activities without having to shift focus from a social networking system over to a commerce application (e.g., a mobile application or web application) of a third-party merchant.

In some embodiments, a social networking system server or application (e.g., a native social networking application of a user device) causes a product to be added to a third-party merchant's shopping cart. Information regarding a product available through a third-party merchant is associated with a product node within the social networking system. A communication (e.g., an advertisement or other post), including the information regarding the product, is provided to a user of the social networking system (e.g., by way of a native or web-based social networking application). It may be that the product is tagged in the communication. A selectable option (e.g., a user-interface control) to add the product to a shopping cart associated with a third-party merchant is provided in conjunction with the communication. If the user chooses the selectable option, a request to add the product to the user's virtual shopping cart is sent to the third-party merchant without redirecting the user away from the social networking system. Accordingly, a user can add a product to the user's shopping cart for a separate third-party merchant (e.g., for later purchase) without shifting focus away from the social networking system.

In other embodiments, a social networking system server may facilitate purchase of a product by a user directly through the social networking system. Information regarding a product available through a social networking system is associated with a product node within the social networking system. A communication (e.g., an advertisement or other post), including the information regarding the product, is provided to a user of the social networking system (e.g., by way of a native or web-based social networking application). It may be that the product is tagged in the communication. A selectable option (e.g., a user-interface control) to purchase the product directly through the social networking system is provided in conjunction with the communication. If the user chooses the selectable option, the social networking system initiates the purchase of the product without redirecting the user to a separate commerce application or system. Accordingly, a user can purchase a product from a social networking system without shifting focus away from the social networking system.

The one or more embodiments disclosed herein help improve a user's social networking experience while still facilitating one or more commerce activities of the user. In particular, products can be purchased and/or saved for purchase at a later time without a user having to shift focus from a social networking system over to a commerce application of a third-party merchant.

As used herein, the term "commerce activity" may refer to any activity by a user or a third-party merchant relating to marketing, promotion, and/or purchase of one or more products (e.g., goods or services). For example, commerce activities can include purchasing a product, adding a product to a virtual shopping cart, recommending a product, or offering a product for sale.

As used herein, the term "networking application" may refer to any application (e.g., a native application or a web-based application) that provides one or more networking services to users of the networking application. For example, a networking application may be a social networking application provided or facilitated by a social networking system, and configured to provide one or more social networking services to its users. Examples of networking applications include, but are not limited to, web-based and mobile applications provided by Facebook(™).

As used herein, the term "commerce application" may refer to any application (e.g., a native application or a web-based application) associated with a merchant of products (e.g., goods or services) and configured to allow users of the commerce application to purchase one or more products from the merchant. Examples of commerce applications include, but are not limited to, ecommerce websites and mobile applications.

As used herein, the term "third-party merchant" may refer to any merchant of goods and services that is separate and independent of a social networking system. For example, a third-party merchant may provide one or more products through an ecommerce website that is independent of a social networking website provided by a social networking system. Examples of third-party merchants include, but are not limited to, merchants providing a specific category of product (e.g., GAP (™)), merchants providing a broad variety of products (e.g., Amazon (™)), merchants having physical as well as virtual stores (e.g., Sears (™)), and merchants having only virtual stores (e.g., eBay (™)).

As will be described in more detail below, users of a social networking application may also be users of separate commerce applications. For example, a user may have a user account on a social networking system and a user account on an ecommerce system. In some embodiments, a social networking system can utilize information regarding a user's account with an ecommerce system to provide one or more of the benefits and advantages described herein. Additionally or alternatively, a social networking system can work together with one or more ecommerce systems to provide the beneficial services described herein.

FIG. 1 is a schematic diagram illustrating a system 100 in accordance with one or more embodiments of the present invention. An overview of the system 100 will be described in relation to FIG. 1. Thereafter, a more detailed description of the implementations, components, and processes of the system 100 will be described in relation to other figures, including FIGS. 2-13D.

As illustrated by FIG. 1, the system 100 can include a networking application 101 (e.g., a social networking application) and a commerce application 111 (e.g., an ecommerce application provided by a third-party merchant) that can work together to provide one or more features discussed herein. Networking application 101 can include a server side networking application component 102 and a device side networking application component 103. Server side networking application component 102 and device side networking application component 103 can interoperate to provide an intended functionality, such as, for example, a social networking functionality. In some embodiments, server side networking application component 102 is a Web server and device side networking application component 103 is a Web browser. In other embodiments, server side networking application component 102 and device side networking application component 103 are different components of a distributed application. Device side networking application component 103 can be an "app" that runs on a computing device, such as, for example, a personal computing device or a mobile device (e.g., a smartphone or a tablet computer).

Similarly, commerce application 111 includes a server side commerce application component 112 and a device side commerce application component 113. Server side commerce application component 112 and device side commerce application component 113 can interoperate to provide an intended functionality, such as, for example, electronic commerce functionality. In some embodiments, server side commerce application component 112 is a Web server and device side commerce application component 113 is a Web browser. In other embodiments, server side commerce application component 112 and device side commerce application component 113 are different components of a distributed application. Device side commerce application component 113 can also be an "app" that runs on a computing device, such as, for example, a personal computing device or a mobile device (e.g., a smartphone or a tablet computer). Commerce application 111 can be associated and/or provided by a third party, such as a third-party merchant. Further, commerce application 111 can facilitate one or more commerce transactions by a user. For example, user 122 can use commerce application to shop for and purchase one or more products. Furthermore, commerce application 111 can enable a virtual shopping cart unique to user 122, and into which user 122 can virtually add one or more products for later purchase. As will be disclosed in further detail herein, user 122 can use networking application 102 to add one or more products to a virtual shopping cart maintained by commerce application 111 without shifting focus away from networking application 101 to commerce application 111.

Device side application components corresponding to multiple different server application components can be installed or loaded on the same computing device. As depicted, device side networking application component 103 and device side commerce application component 113 can both be installed on a computing device 121. For example, a social network system "app" and an electronic commerce "app" can both be installed on computing device 121. Computing device 121 can be associated with a user 122 and may include any suitable computing device, such as a mobile device or a personal computing device.

Networking application 101 may manage or maintain information related to one or more products that can be made available to users, such as user 122. In some embodiments, networking application 101 can receive product data 116 from commerce application 111, the product data 116 being representative of product information for one or more products available on commerce application 111. Alternatively, networking application 101 can independently obtain and maintain product data 116. For example, networking application 101 can electronically survey and/or view products available through commerce application 111 to build a database of product data 116 that is updated at predetermined intervals. Product data 116 can include data for products that are being offered for sale through commerce application 111 (and can be products from one or more different merchants). As will be described in greater detail below, product data 116 can be included in or be associated with a node within a social networking system.

Networking application 101 can present product data 116 to users, such as, for example, user 122. In some embodiments, product data 116 is presented to users of a social networking system by way of a user's social networking activity feeds (e.g., news feeds). In additional embodiments, networking application 101 can comprise an ecommerce application (e.g., an ecommerce website) that presents the product data 116 to a user within a initial display of networking application 101 (e.g., a landing page of a website), or within a display of search results (e.g., within a list of type-ahead search results or within a full page of results responsive to a completed search). In general, product data 116 presented to a particular user can be customized based on user information available to the networking application 101. Additionally or alternatively, product presentation can be based on any of: user's product interests, product interests of other users (e.g., friends), tagging by a user, tagging by a merchant, advertisements, etc.

Users can perform various electronic commerce activities with respect to products presented to them by networking application 101. For example, users can add a product to a third-party merchant's shopping cart or buy a product directly through networking application 101. A commerce activity performed by a user can cause networking application 101 to send a request, such as, for example, commerce related request 117, to commerce application 111. For example, commerce related request 117 can be a request to add a product to user 122's shopping cart associated with commerce application 111, a request by user 122 to purchase a product offered by way of commerce application 111, a request for fulfillment of a product purchase, etc. Alternatively, networking application 101 can facilitate direct purchase of a product through networking application 101 without the need to send commerce related request 117 to commerce application 111.

Figure 2:
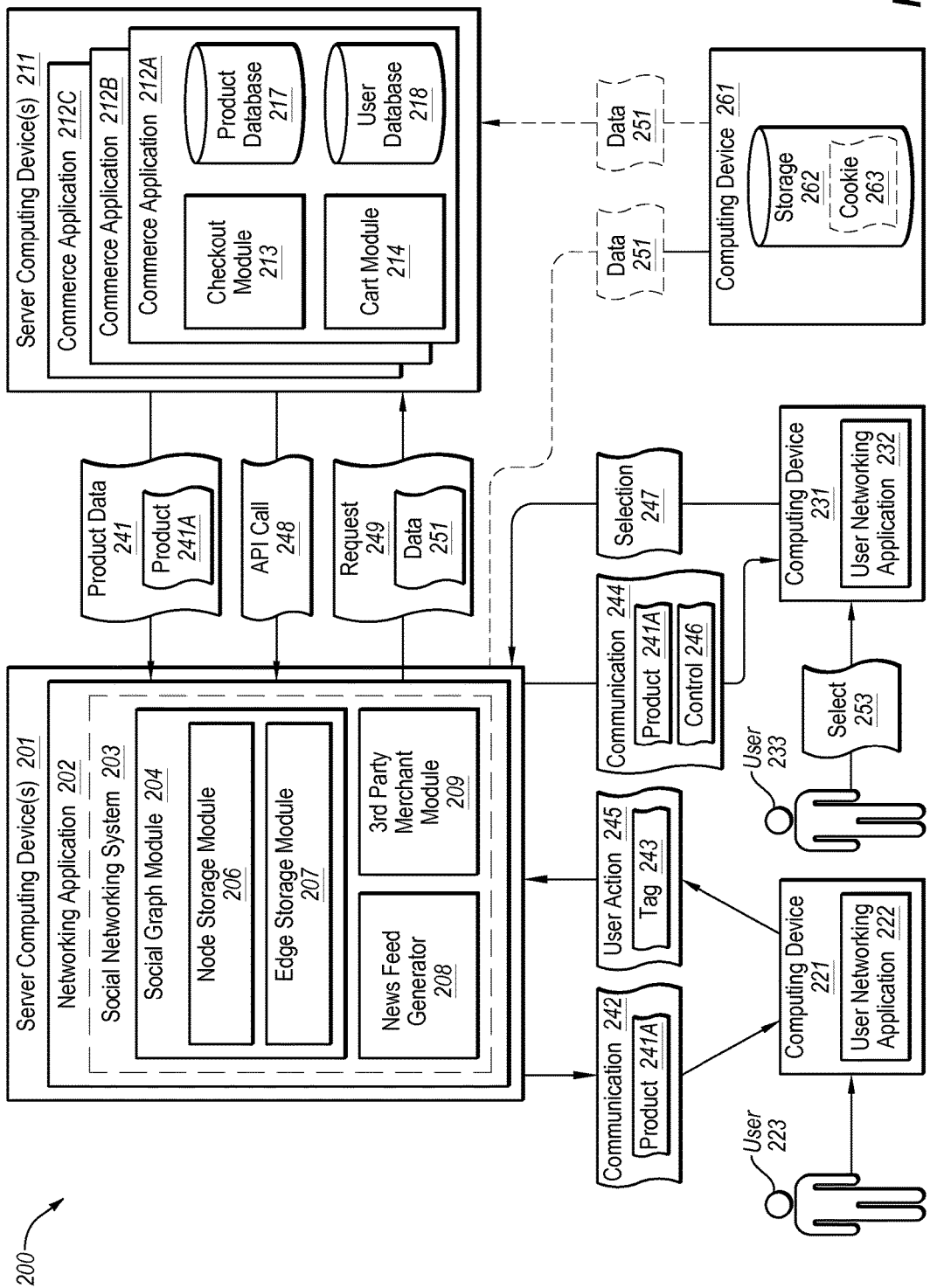
FIG. 2 illustrates a schematic diagram of one example implementation of the system of FIG. 1 in accordance with principles described herein.

FIG. 2 illustrates a schematic diagram illustrating a system 200 in accordance with an embodiment of the present invention. System 200 illustrates one example embodiment of system 100. In particular, FIG. 2 illustrates a networking application 202 and various commerce applications 212A-212C. As depicted in FIG. 2, computing device users (e.g., 223 and 233) can use user networking applications (e.g., 222 and 232 respectively) at computing devices (e.g., 221 and 231 respectively) to access networking application 202. In embodiments where networking application 202 and/or commerce application 212A is a web application, user networking applications 222 and 232 can be web browsers or other user commerce applications.

System 200 includes a set of one or more server computing devices 201 that provide networking application 202 including a news feed generator 208 and a third-party merchant module 209. In one or more embodiments of the invention, networking application 202 comprises a social-networking system 203 (such as but not limited to FACEBOOK (™)), but in other embodiments the networking application 202 may comprise another type of application, including but not limited to an e-mail application, search engine application, banking application, or any number of other application types that utilize user accounts.

In one or more embodiments where the networking application 202 comprises a social networking system 203, the networking application 202 may include a social graph module 204 for representing and analyzing a plurality of users, products, and other concepts. A node storage module 206 of the social graph module 204 can store node information comprising nodes for users, nodes for products, nodes for concepts, nodes for items, or any other suitable nodes within social networking system 203. An edge storage module 207 of the social graph module 204 can store edge information comprising relationships between nodes and/or actions occurring within the social networking system 203. Further detail regarding social-networking systems, social graphs, edges, and nodes is presented below with respect to FIG. 15.

In such embodiments where networking application 202 is a web application, the server computing devices 201 may include a web application server (including but not limited to the Apache HTTP Server by the Apache Software Foundation, Internet Information Services (IIS) by Microsoft Corporation, nginx by NGINX, Inc., the open-source lighttpd web server, and Google Web Server (GWS) by Google Inc.) and optionally a relational or non-relational database (including but not limited to MySQL by Oracle Corporation, PostgreSQL by the PostgreSQL Global Development Group, Apache Cassandra by the Apache Software Foundation, HBase by the Apache Software Foundation, and MongoDB by 10 gen) for storing social graph data.

System 200 also includes a set of one or more server computing devices 211 that provide a plurality of commerce applications, including commerce applications 212A-212C. Each commerce application 212A-212C can correspond to one or more third-party merchants that offer products for sale through electronic commerce avenues. Although FIG. 2 shows commerce applications 212A-212C together, one will appreciate that each of commerce applications 212A-212C may be independent of each other and may be associated with an independent third-party merchant. Each commerce application 212A-212C can also include one or more of a checkout module, a cart module, a product database, and a user database. For example, commerce application 212A includes checkout module 213, cart module 214, product database 217, and user database 218.

Generally, checkout module 213 interoperates with a payment network to settle transactions for purchased products. Cart module 214 is configured to accumulate and maintain status for one or more products a user has (at least initially) added to a virtual shopping cart. Checkout module 213 can be used to settle transactions for products placed in a user's cart module 214 and then subsequently purchased. Product database 217 stores product data for any products offered for sale by a third-party merchant through commerce application 212A. User database 218 stores user specific information (e.g., login, password, account, address, or payment information) for users of commerce application 212A. In some embodiments, user accounts within product database 218 may be associated with users of networking application 202. For example, a user account for commerce application 212A may be linked in some way to a user profile from networking application 202.

In such embodiments where the commerce application 212A is a web application, the server computing devices 211 may include a web application server (including but not limited to the Apache HTTP Server by the Apache Software Foundation, Internet Information Services (IIS) by Microsoft Corporation, nginx by NGINX, Inc., the open-source lighttpd web server, and Google Web Server (GWS) by Google Inc.) and optionally a relational or non-relational database (including but not limited to MySQL by Oracle Corporation, PostgreSQL by the PostgreSQL Global Development Group, Apache Cassandra by the Apache Software Foundation, HBase by the Apache Software Foundation, and MongoDB by 10 gen) for storing product database 217 and user database 218.

In some embodiments, a user uses more than one computing device or uses different computing devices to access networking application 202 and/or commerce application 212A. For example, user 233 may use one or the other, or both, of computing device 231 (e.g., a mobile phone) and computing device 261 (e.g., a desktop PC) to access networking application 202 and/or commerce application 212A.

Figure 3:
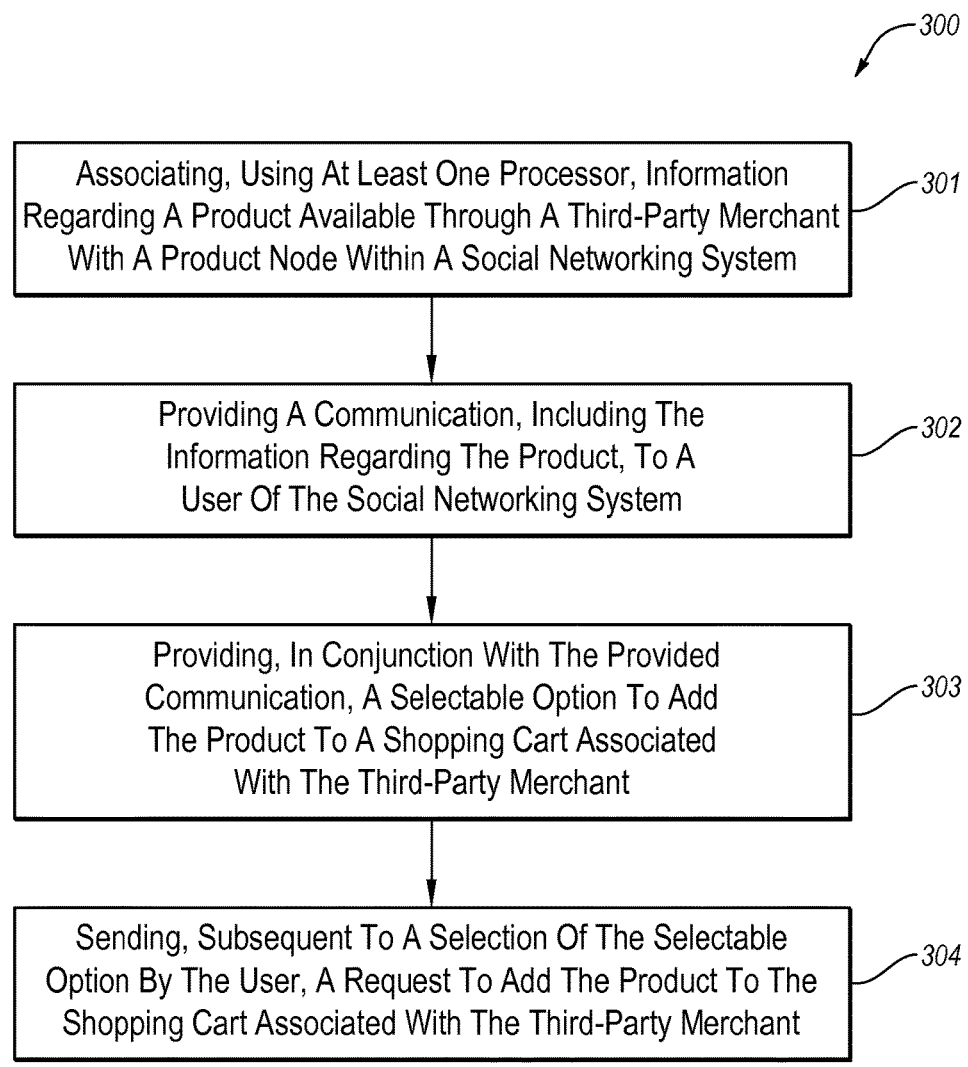
FIG. 3 illustrates a flowchart of a series of acts in a method of adding a product to a third-party merchant shopping cart in accordance with principles described herein.

FIG. 3 illustrates a flowchart of an example method 300 in accordance with an embodiment of the present invention. Method 300 will be described with respect to the components and data of system 200.

Method 300 includes associating, using at least one processor, information regarding a product available through a third-party merchant with a product node within a social networking system (301). For example, and referring again to FIG. 2, social graph module 204 can associate information regarding a product 241A in a product node within social networking system 203.

In some embodiments, server computing device(s) 211 can send product data 241 to networking application 202. Product data 241 can include data for products, such as, product 241A, being offered for sale by third-party merchants through one or more of commerce applications 212A-212C. Social graph module 204 can process product data 241 to create or update product nodes for products included in product data 241. Product nodes can be stored, updated, and managed by node storage module 206. Social graph module 204 can also create edges between product nodes and other nodes in a social network graph. Edges for products nodes and other nodes can be stored by end storage module 207. Additionally or alternatively, networking application 202 can manage product information in any other suitable manner.

As shown in FIG. 3, method 300 includes providing a communication, including the information regarding the product, to a user of the social networking system (302). Method 300 further includes providing, in conjunction with the provided communication, a selectable option to add the product to a shopping cart associated with the third-party merchant (303). For example, and referring again to FIG. 2, news feed generator 208 can send a communication 244 (e.g., a post or advertisement) comprising information for product 241A and a control 246 (e.g., a selectable UI control element), to computing device 231. Communication 244 can be sent to computing device 231 based on an interest of user 233 in product 241A or based on a connection between user 233 and an originator (e.g., another user or a merchant) of a communication (e.g., post or advertisement) comprising the information associated with product 241A. For example, news feed generator 208 can send the communication 244 based on the fact that user 233 may have an account with commerce application 212A.

User networking application 232 can present information regarding product 241A along with a control 246 in a user-interface at computing device 231. Control 246 can be a user-interface control, such as, for example, an "Add To Cart" button, that when selected, adds product 241A to user 233's cart within commerce application 212A. Product 241A can be added to user 233's cart automatically and without further user intervention. Advantageously, user 233 maintains focus on the news feed from news feed generator 208, while also being able to add product 241A to their cart within commerce application 212A. In some examples, control 246 may be selectively enabled based on whether or not user 233 has a user account with commerce application 212A. For example, networking application 202 may enable control 246 after authenticating the user's account with commerce application 212A (e.g., via a login process, either directly through commerce application or by leveraging social networking system 203 to login to the commerce application 212A). Otherwise, networking application 202 may provide information regarding product 241A to user 233 without enabling control 246.

Furthermore, if the user 233 does not have an account with commerce application 212A, networking application 202 may set up a temporary cart to store information associated with user 233's ecommerce activities within networking application 202. In particular, networking application 202 can create a temporary data object including data representative of any products that user 233 has requested to be added to a cart for commerce application 212A. This information can include specifics regarding the products themselves, any variables associated with the products (e.g., size, color, and quantity), and/or corresponding merchant information (e.g., identifying commerce application 212A). Networking application 202 can then send an indication to commerce application 212A that networking application 202 has created a temporary shopping cart for commerce application. Networking application 202 can also provide commerce application 212A with identification information specific to user 233 (e.g., name, username, address, ID number, IP address). Networking application 202 can push the temporary cart information to commerce application 212A or can make it available for subsequent access by commerce application 212A. This process can either occur on the backend (e.g., directly between server computing device 201 and server computing devices 211) or by way of computing device 231 (e.g., networking application 202 can cause computing device 231 to store the temporary cart within a cookie for subsequent access by commerce application 212A, such as when user 233 next uses computing device 231 to access commerce application 212A). Thus, despite not having previously set up an account with commerce application 212A, user 233 can enjoy the same benefits as other account holders and then later access the contents of the temporary cart with the user's social networking system profile information, and at that time, create a permanent account with the commerce application 212A.

Additionally or alternatively, control 246 can include a plurality of controls corresponding to product 241A. To illustrate, control 246 can include a control for each of commerce applications 212A-212C through which product 241A is available and/or for which user 233 has a user account. Accordingly, user 233 can choose to add product 241A to a shopping cart associated with any of commerce applications 212A-212C.

In yet further embodiments, product 241A may be available for purchase directly through networking application 202. In such embodiments, control 246 can be a user-interface control that, when selected, initiates a purchase of product 241A through networking application 202.

If product 241A is available directly through networking application 202 and through one or more of commerce applications 212A-212C, control 246 can include any number of corresponding user-interface controls. For example, control 246 can include a user-interface control for purchasing product 241A through networking application 202, a user-interface control for adding product 241A to a shopping cart associated with a first third-party merchant (e.g., commerce application 212A), and a user-interface control for adding product 241A to a shopping cart associated with a second third-party merchant (e.g., commerce application 212B). The provision of such user-interface controls may be based on whether user 233 has a user account with networking application 202 and/or each of commerce applications 212A-212C.

As mentioned above, news feed generator 208 can include product 241A in communication 244 in response to the actions of other users. For example, during operation of social network system 203, news feed generator 208 can send a communication 242 to computing device 221. As depicted, communication 242 includes information regarding product 241A. User networking application 222 can present communication 242, including information for product 241A, in a user interface at computing device 221. As such, user 223 can interact with product 241A as presented through the user interface. Data representative of a user action 245 by user 223 can be sent back to networking application 202 from computing device 221. In some embodiments, user action 245 represents a selection by user 223 of a user-interface control (e.g., a "like" icon) to indicate interest in product 241A. In response to selection of the user-interface control, user networking application 222 can notify networking application 202 of user action 245.

In other embodiments, user action 245 may include a communication (e.g., a post) including a tag 243 of product 241A within the communication. User 223 can include tag 243 in the communication in any suitable manner. For example, user 223 can type a name for product 241A within the communication and social graph module 204 can, automatically or upon prompting by the user, insert a tag 243 to product 241A within the communication. In some embodiments, as user 223 begins typing a name for product 241A, social graph module 204 may present user 223 with one or more products matching what user 223 has typed. Each of the listed products may be represented by a node within social networking system 203. Thereafter, user 223 may select product 241A from the list of the one or more products, and social graph module 204 can include tag 243 in the communication in response to the selection by user 223.

Social graph module 204 can process user action 245 and identify other users of social networking system 203 that may be interested in product 241A based on user action 245 associated with product 241A. For example, social graph module 204 can determine that user 233 may be interested in product 241A because user 223 "liked" product 241A, and user 233 and user 223 are connected within social networking system 203. Therefore, because user 233 and user 223 are connected within social networking system 203, the news feed generator 208 can include information regarding product 241A within communication 244 in response to user 223 having "liked" product 241A.

It may be that user 233 is interested in buying product 241A. As such, user 233 can select 253 control 246 within communication 244. In response to a selection of control 246, user networking application 232 can notify networking application 202 of the user selection. For example, user networking application 222 can send selection 247 to networking application 202 to indicate that control 246 was selected at computing device 231.

As shown in FIG. 3, method 300 includes sending, subsequent to a selection of the selectable option by the user, a request to add the product to the shopping cart associated with the third-party merchant (304). For example, and referring again to FIG. 2, data 251 can be sent to commerce application 212A. Data 251 can request that product 241A be added to a user 233's shopping cart.

In some embodiments, data 251 is sent in response to selection of control 246. For example, 3rd party merchant module 209 can send request 249, containing data 251, to commerce application 212A in response to receiving selection 247. In other embodiments, data 251 is kept at social networking system 203 until requested. For example, commerce application 212A can issue an API call 248 to networking application 202. In response to API call 248, 3rd party merchant module 209 can send request 249, containing data 251, to commerce application 212A.

Alternately, data 251 can be sent to commerce application 212A by way of a different computing device (e.g., a personal computer). For example, 3rd party merchant module 209 can send data 251 to computing device 261 for storage in response to receiving selection 247. Computing device 261 can receive data 251 and store data 251 as a cookie 263 in storage 262. Commerce application 212A can later access data 251 from computing device 261 to add product 241A to user 233's cart. To illustrate, user 233 may utilize computing device 231 to request that product 241A be added to user 233's shopping cart on commerce application 212A. Networking application 202 may then use a separate computing device 261 associated with user 233 to store cookie 263 for later retrieval by commerce application 212A (e.g., when user 233 uses computing device 261 to access commerce application 212A). Subsequently, at a time of their choosing, user 233 can access their shopping cart at commerce application 212A and complete the purchase of product 241A. Alternatively, the networking application 202 may store cookie 263 on the same computing device as was used to send the request. For example, user 233 can send a request to add product 241A to user 233's cart on commerce application 212A using computing device 231. A cookie can be stored on computing device 231 in response to user 233 sending the request. Subsequently, at a time of user 233's choosing, user 233 can access user 233's shopping cart at commerce application 212A at which time the information stored in the cookie is passed to commerce application 212A, and user 233 is provided an opportunity to complete the purchase of the product.

Figure 4:
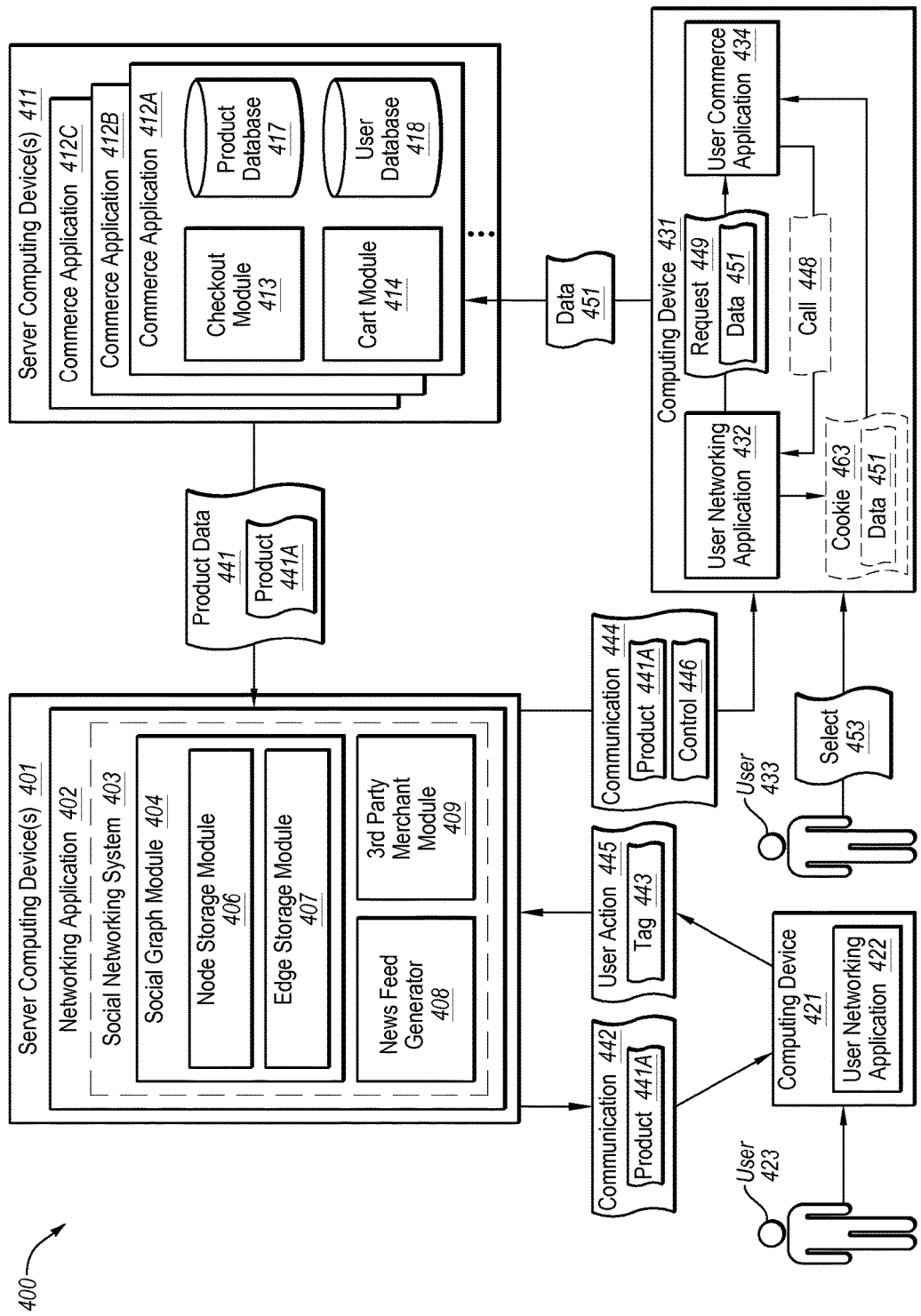
FIG. 4 illustrates a schematic diagram of another example implementation of the system of FIG. 1 in accordance with principles described herein.

FIG. 4 illustrates a schematic diagram illustrating a system 400 in accordance with an embodiment of the present invention. System 400 illustrates another example embodiment of system 100. In particular, FIG. 4 illustrates networking application 402 and various commerce applications 412A-412C. As depicted in FIG. 2, computing device users (e.g., 423 and 433) can use user networking applications (e.g., 422 and 432 respectively) at computing devices (e.g., 421 and 431 respectively) to access networking application 402. Computing device 431 can also use commerce application 434 (e.g., a special purpose "app") associated with commerce application 412A. In embodiments where networking application 402 and/or commerce application 412A is a web application, user networking applications 422 and 432 can be web browsers or other user commerce applications.

System 400 includes a set of one or more server computing devices 401 that provide networking application 402 including news feed generator 408 and third-party merchant module 409. In one or more embodiments of the invention, networking application 402 comprises a social networking system 403 (such as but not limited to FACEBOOK (™)), but in other embodiments the networking application 402 may comprise another type of application, including but not limited to an e-mail application, search engine application, banking application, or any number of other application types that utilize user accounts.

In one or more embodiments where the networking application 402 comprises a social networking system 403, the networking application 402 may include a social graph module 404 for representing and analyzing a plurality of users, products, and other concepts. A node storage module 406 of the social graph module 404 can store node information comprising nodes for users, nodes for products, nodes for concepts, etc. An edge storage module 407 of the social graph module 404 can store edge information regarding relationships between nodes and/or actions occurring within the social networking system 403. Further detail regarding social-networking systems, social graphs, edges, and nodes is presented below with respect to FIG. 15.

In such embodiments where networking application 402 is a web application, the backend providing data and logic for networking application 402 may include a web application server (including but not limited to the Apache HTTP Server by the Apache Software Foundation, Internet Information Services (IIS) by Microsoft Corporation, nginx by NGINX, Inc., the open-source lighttpd web server, and Google Web Server (GWS) by Google Inc.) and optionally a relational or non-relational database (including but not limited to MySQL by Oracle Corporation, PostgreSQL by the PostgreSQL Global Development Group, Apache Cassandra by the Apache Software Foundation, HBase by the Apache Software Foundation, and MongoDB by 10 gen) for storing social graph data.

System 400 also includes a set of one or more server computing devices 411 that provide a plurality of commerce applications, including commerce applications 412A-412C. Each commerce application 412A-412C can correspond to one or more third party merchants that offer products for sale through electronic commerce avenues. Each commerce application can also include one or more of a checkout module, a cart module, a product database, and a user database. For example, commerce application 412A includes checkout module 413, cart module 414, product database 417, and user database 418.

Generally, checkout module 413 interoperates with a payment network to settle transactions for purchased products. Cart module 414 is configured to accumulate and maintain status for one or more products a user has (at least initially) indicated some level of interest in purchasing. Checkout module 413 can be used to settle transactions for products placed in a user's cart by cart module 414. Product database 417 stores product data for any products offered for sale by third-party merchants through commerce application 412A. User database 418 stores user specific information (e.g., login, password, address, payment, etc.) for users of commerce application 412A.

In such embodiments where the commerce application 412A is a web application, the backend providing data and logic for commerce application 412A may include a web application server (including but not limited to the Apache HTTP Server by the Apache Software Foundation, Internet Information Services (IIS) by Microsoft Corporation, nginx by NGINX, Inc., the open-source lighttpd web server, and Google Web Server (GWS) by Google Inc.) and optionally a relational or non-relational database (including but not limited to MySQL by Oracle Corporation, PostgreSQL by the PostgreSQL Global Development Group, Apache Cassandra by the Apache Software Foundation, HBase by the Apache Software Foundation, and MongoDB by 10 gen) for storing product database 417 and user database 418.

From time to time, server computing device(s) can send product data 441 to networking application 402. Product data 441 can include data for products, such as, product 441A, being offered for sale by third-party merchants through one or more of commerce applications 412A-412C. Social graph module 404 can process product data 441 to create product nodes for products included in product data 441. Product nodes can be stored by node storage module 406. Social graph module 404 can also create edges between product nodes and other nodes in a social network graph. Edges for product nodes and other nodes can be stored by edge storage module 407.

Figure 5:
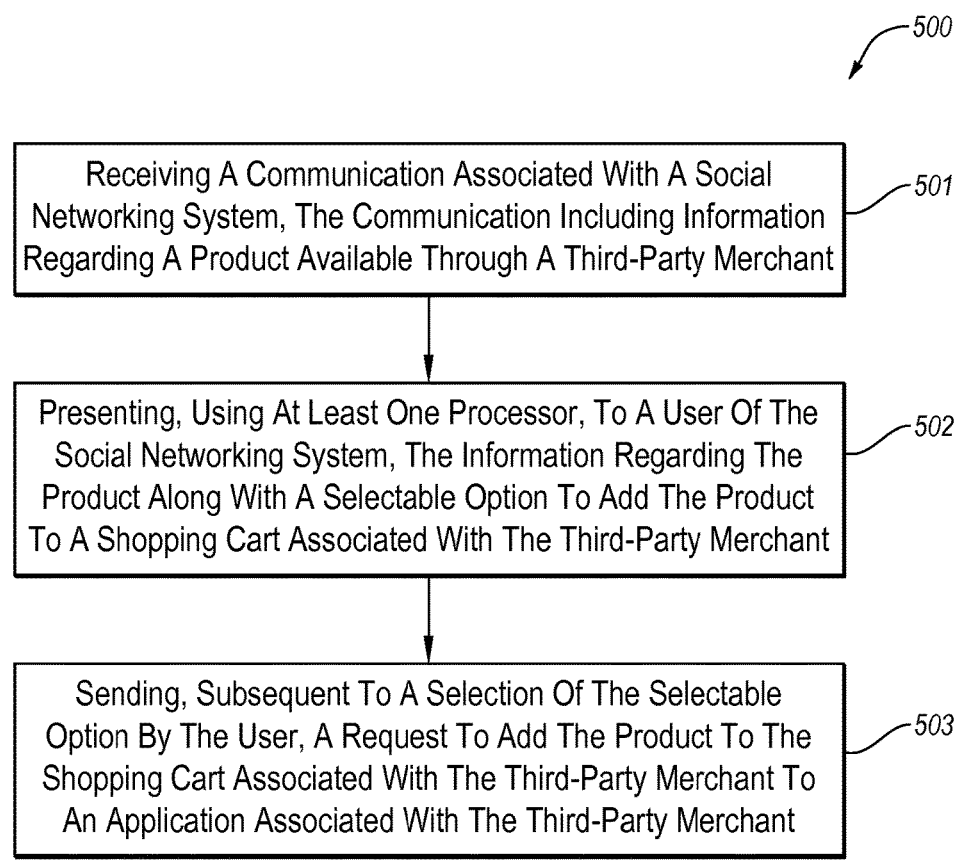
FIG. 5 illustrates a flowchart of a series of acts in another method of adding a product to a third-party merchant shopping cart in accordance with principles described herein.

FIG. 5 illustrates a flowchart of an example method 500 in accordance with an embodiment of the present invention. Method 500 will be described with respect to the components and data of system 400.

Method 500 includes receiving a communication associated with a social networking system, the communication including information regarding a product available through a third-party merchant, the product being associated with a product node within the social networking system (501). For example, and referring again to FIG. 4, computing device 431 can receive communication 444 from news feed generator 408. Communication 444 can be sent to computing device 431 and can include information regarding product 441A based on a predicted interest of user 433 in product 441A.

Alternately to user 433's interest in product 441A, product 441A can be included in communication 444 in response to one or more actions of other users (e.g., a friend of user 433 or a third-party merchant). For example, during operation of social network system 403, news feed generator 408 can send communication 442 to computer device 421 associated with user 423. As depicted, communication 442 includes information for product 441A (e.g., within a post). User networking application 422 can present communication 442, including information for product 441A, in a user interface at computing device 421. As such, user 423 can interact with product 441A as presented through the user interface. In some embodiments, user 423 selects a user-interface control (e.g., a "like" icon) to indicate an interest in product 441A. In response to selection of the user-interface control, user networking application 422 can notify networking application 402 of user action 445. For example, user networking application 422 can send an indication of user action 445 (e.g., the indication of interest of user 423 in product 441A) back to user networking application 402. Alternatively, user action 445 can include a new communication (e.g., post) and tag product 441A within the communication. For example, user 423 can type a name for product 441A within the communication and social graph module 404 can insert a tag 443 to product 441A within the communication. In some embodiments, as user 423 begins typing a name for product 441A, social graph module 404 may present user 423 with one or more products matching what user 423 has typed. Each of the listed one or more products may be represented by a product node within node storage module 406. Thereafter, user 423 may select product 441A from the list of one or more products and social graph module 404 can include a tag in the communication in response to the selection by user 423.

Social graph module 404 can process user action 445 and identify other users of social networking system 403 that may be interested in product 441A based on user action 445. For example, social graph module 404 can determine that user 433 may be interested in product 441A because user 423 and user 433 are friends within social networking system 403 and/or because user 423 and user 433 share similar interest profiles. Additionally or alternatively, social graph module 404 may determine that user 433 may be interested in product 441A because product 441A has one or more similarities (e.g., brand similarities, product type similarities, industry similarities, product demographic similarities) with one or more products that user 433 has expressed interest in (e.g., "liked") previously. In response, news feed generator 408 can send communication 444 to computing device 431 including information regarding product 441A.

As depicted, communication 444 includes information for product 441A and a control 446 (e.g., a cart control). Product 441A can be associated with a product node in a social networking graph maintained by social graph module 404. Control 446 can be a user-interface control, such as, for example, an "Add To Cart" button that, when selected, adds product 441A to user 433's cart within commerce application 412A. Product 441A can be added to user 433's cart automatically and without further user intervention. Advantageously, user 433 maintains focus on the communication 444 while being able to add product 441A to their cart on commerce application 412A.

As shown in FIG. 5, method 500 further includes presenting, using at least one processor, to a user of the social networking system, the information regarding the product along with a selectable option to add the product to a shopping cart associated with the third-party merchant (502). For example, and referring again to FIG. 4, user networking application 432 can present product 441A along with control 446 in a user-interface at computing device 431. It may be that user 433 is interested in buying product 441A. As such, user 433 can select 453 control 446 from news feed 444.

As shown in FIG. 5, method 500 includes sending, subsequent to a selection of the selectable option by the user, a request to add the product to the shopping cart associated with the third-party merchant to an application associated with the third-party merchant. For example, subsequent to selection of cart control 446, computing device 431 can formulate data 451. Data 451 can operate to request that product 441A be added to a user 433's shopping cart.

In some embodiments, data 451 is sent to user commerce application 434 in response to selection of control 446. For example, user networking application 432 can send request 449, containing data 451, to user commerce application 434 in response to receiving the selection of control 446. In other embodiments, user networking application 432 formulates data 451 but holds data 451 until requested. User commerce application 434 can issue a call 448 to user networking application 432 to request data 451. In response to call 448, user networking application 432 can send data 451 to user commerce application 434.

In other embodiments, data 451 is stored in more durable storage at computing device 431. For example, data 451 can be stored in a cookie 463. User commerce application 434 can subsequently access cookie 463 to obtain data 451.

User commerce application 434 can then send data 451 to commerce application 412A to cause product 441A to be added to user 433's cart. Subsequently, at a time of their choosing, user 433 can access their shopping cart at commerce application 412A and complete the purchase of product 441A.

Other embodiments related to purchasing a product are also within the scope of the presented invention. In one or more embodiments, a product is purchased directly from a social networking news feed. Purchase directly from a social networking news feed relieves a user form having to subsequently access their cart to complete a purchase. Further description related to direct product purchases is included below.

Figure 6:
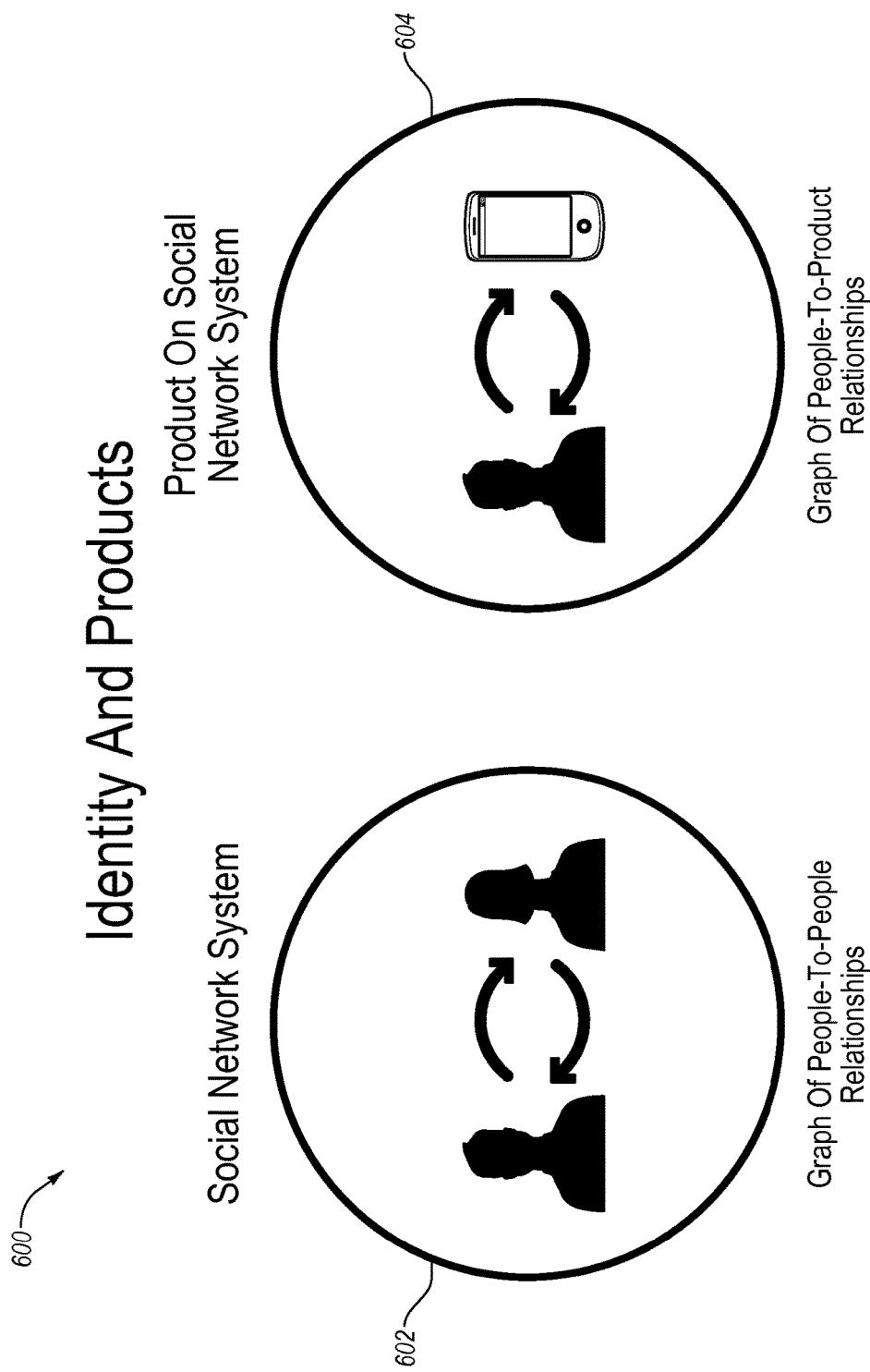
FIG. 6 illustrates a schematic diagram regarding relationships within a social networking system in accordance with principles described herein.

FIG. 6 illustrates a schematic diagram regarding relationships within a social networking system. Traditionally, social networking systems maintain and manage relationships between multiple users of the social networking system, as shown at 602. However, in accordance with embodiments of the present invention, a social networking system can additionally maintain and manage relationships between users of the social networking system and products represented by nodes within the social networking system, as shown at 604.

Figure 7:
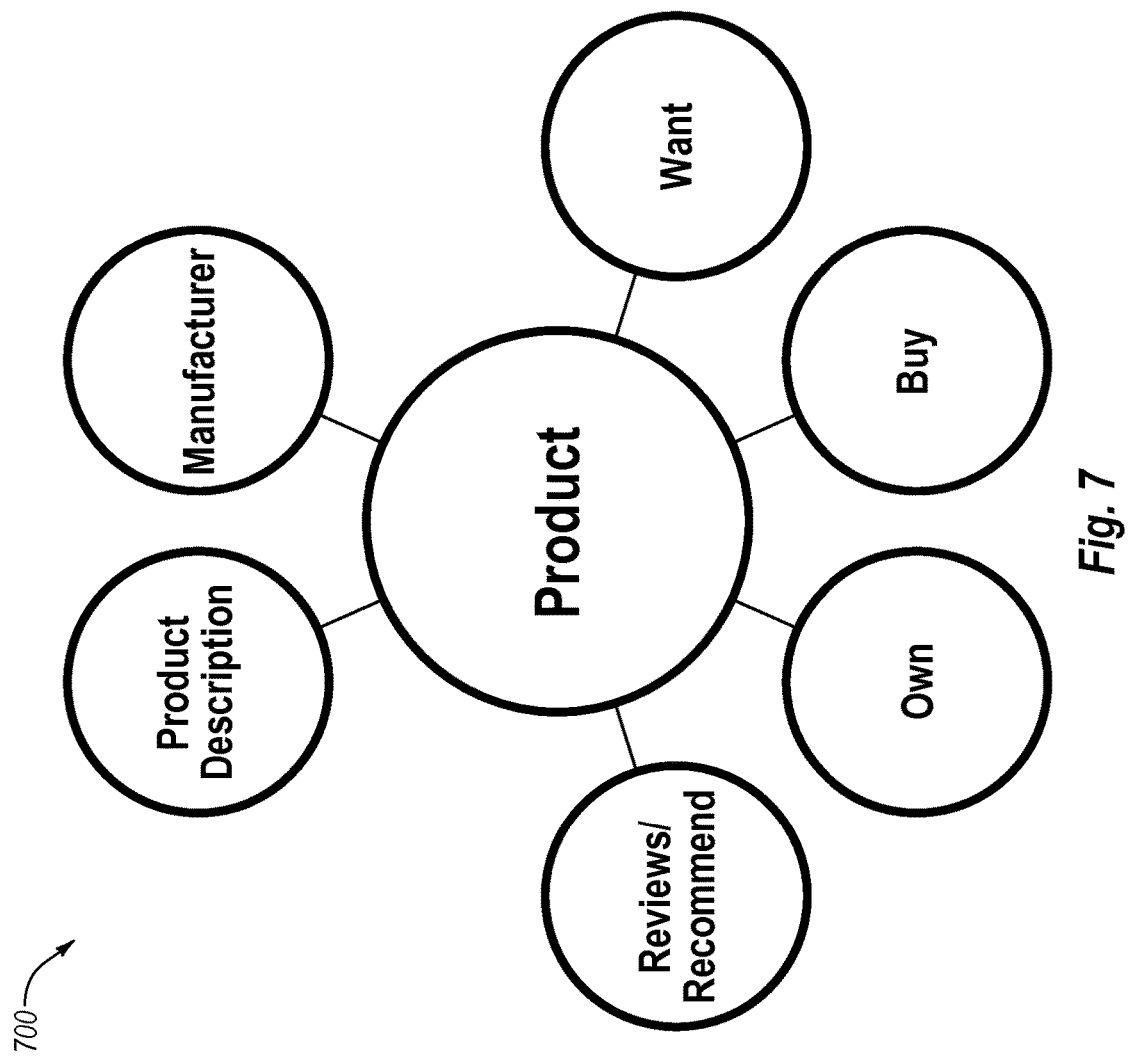
FIG. 7 illustrates a schematic diagram of an example product node in accordance with principles described herein.

FIG. 7 illustrates a schematic diagram of an example product node 700. As shown, product node 700 can include various types of information regarding a particular product. For example, information maintained within product node 700 can include a product description, a manufacturer of the product, a list of users that have reviewed or recommended the product, a list of users who own the product, information regarding how/where to buy the product, and a list of users that want the product.

FIG. 8 illustrates an example of presenting data from a product node. As shown, FIG. 8 includes an example graphical user interface 800 (or simply "GUI 800") including a product page representative of a product node within a social networking system. GUI 800, and the corresponding product node, may be provided and/or managed by one or more components of systems 100, 200, and/or 400 described in detail above (e.g., by networking application 101, social networking system 203, or social networking system 403).

GUI 800 illustrates an example page of information associated with a particular product (e.g., an iPad 2). GUI 800 includes a variety of information and options associated with the represented product. For example, the information included in GUI 800 includes a product name, a product category, a product manufacturer, a product description, one or more product images, a list of users (e.g., friends) that "want" the product, a list of users that recommend the product, a list of merchants that provide, etc. In addition, GUI 800 includes a plurality of selectable options including an option to indicate that the user "wants" the product, an option to indicate that the user "recommends" the product, an option to "like" the product, options associated with merchants through which the user can purchase the product, etc. Further, GUI 800 includes a selectable option 802 for a user to "Create a Product Page." Option 802 may be used by a user to create a new product page and, as a result, a new product node within the social networking system. Accordingly, a user (e.g., a merchant) can create a new product node and product page to represent a product (e.g., a product that a merchant wishes to provide by way of the social networking system). The user can subsequently provide any product information to associate with the product page/node. Furthermore, the user can enable one or more options for other users to purchase the product. The enabled options may further include an option to add the product to a shopping cart associated with a third-party merchant (e.g., for a separate ecommerce website associated with the third-party merchant).

In addition, in response to a user's interactions with the information and/or options included in GUI 800, a corresponding social networking system can make other users of the social networking system aware of the user's actions. For example, if the user "likes" the product, the social networking system can make "friends" of the user aware of this user action. To illustrate, the social networking system can include information regarding the user action in news feeds of the other users.

Figure 9A:
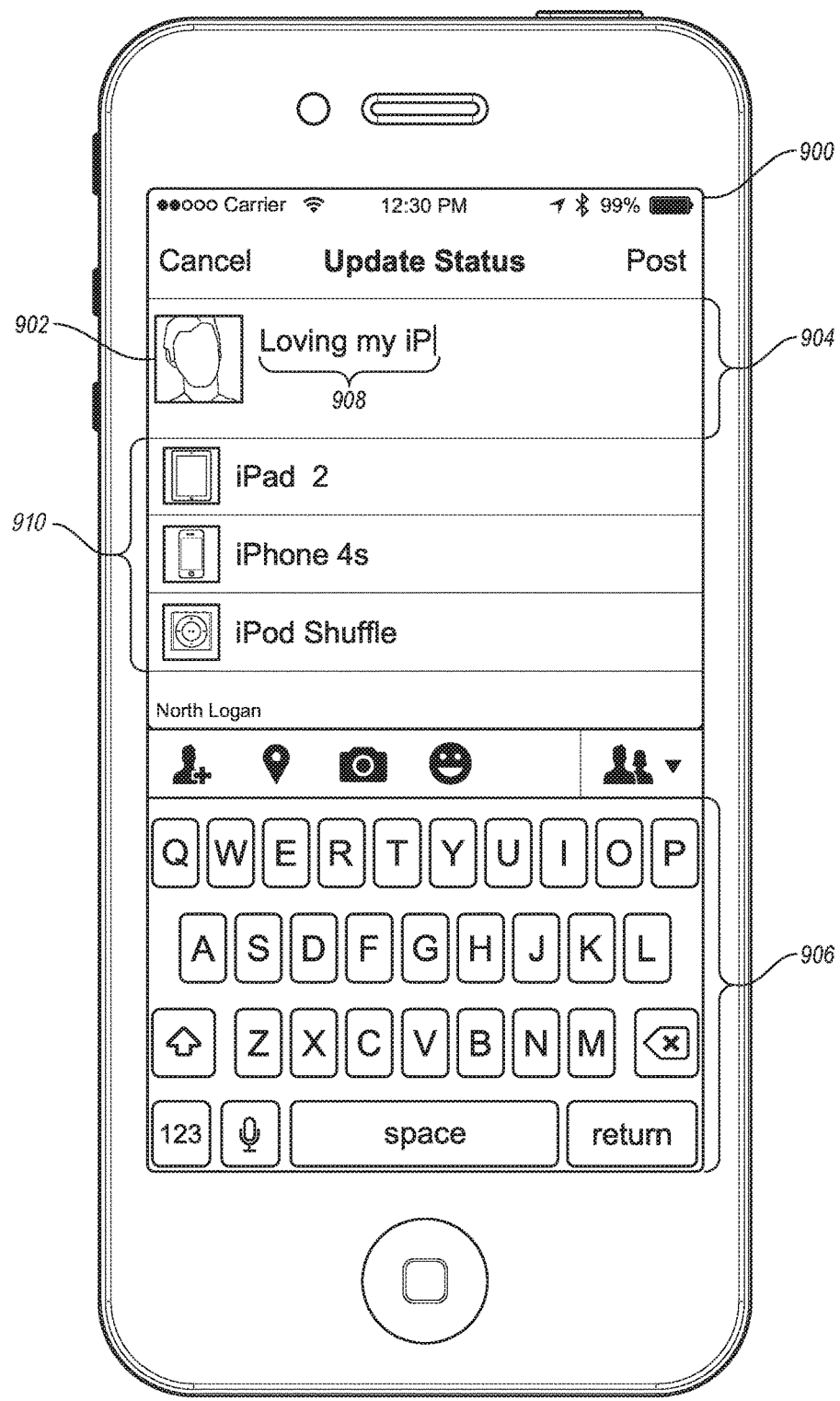
FIGS. 9A-9B include graphical user interfaces illustrating an example composition of a social networking communication in accordance with principles described herein.
Figure 9B:
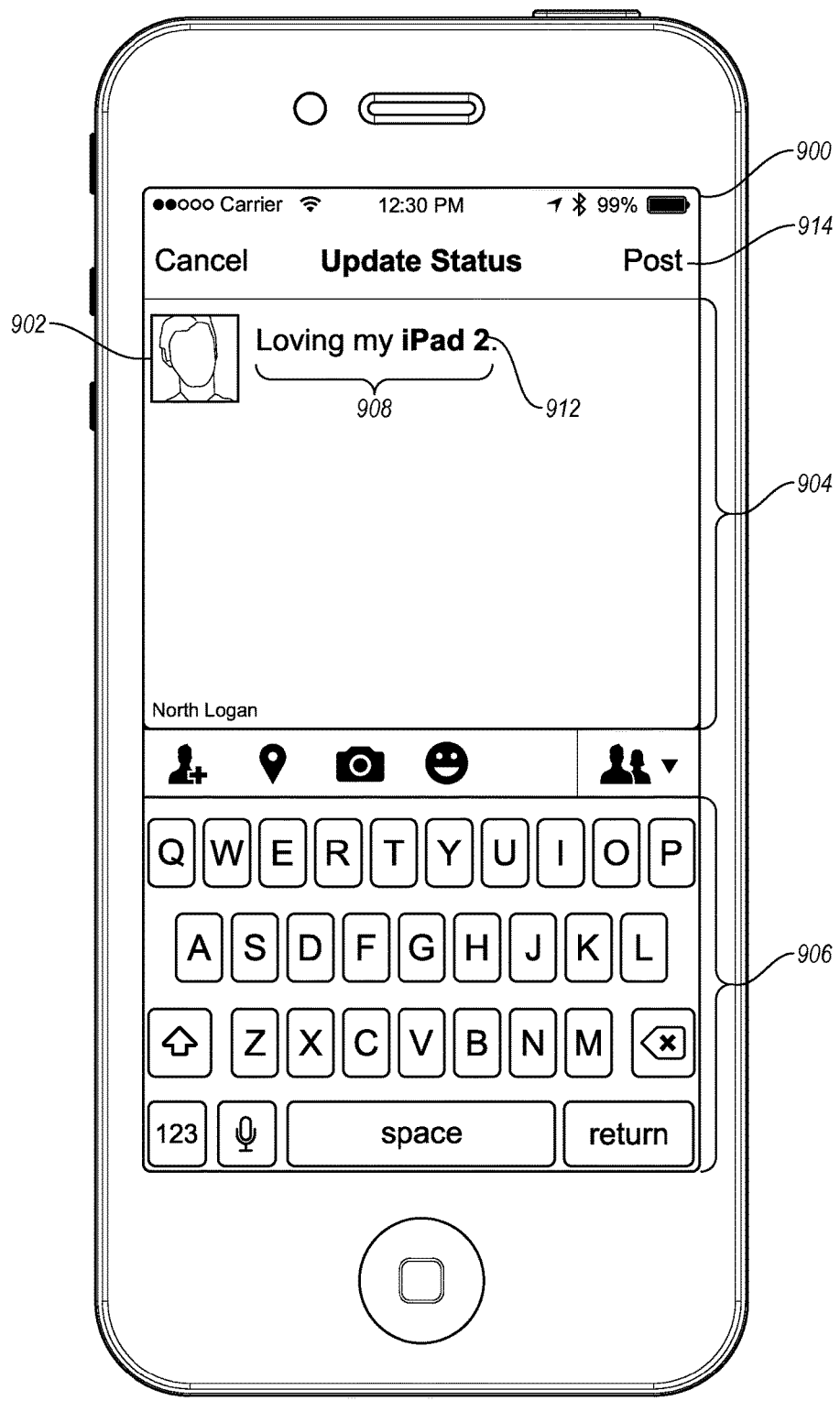

As mentioned above, in one or more embodiments of the present invention, a user can "tag" a product within a social networking communication. FIGS. 9A-9B illustrate an example composition of a social networking communication. In particular, FIGS. 9A-9B illustrate various views of a graphical user interface 900 for composing a communication including a tag associated with a product (e.g., the product represented in FIG. 8).

FIG. 9A illustrates a first view of a graphical user interface (or simply "GUI 900") provided to facilitate composition of a communication (e.g., a post) by a user 902. GUI 900 includes a composition area 904, within which user 902 can compose a communication 908 using keyboard 906. As shown, user 902 has composed a portion of communication 908 by inputting text. As user 902 inputs the text, GUI 900 may be populated (e.g., automatically or in response to a request by user 902) with a listing of products 910 matching at least a portion of text of communication 908. As user 902 continues to input text, the listing of products 910 is continually updated to reflect products matching the inputted text. To illustrate, based on the inputted text "iP," listing of products 910 is populated with a plurality of products having names including or beginning with "iP" (e.g., "iPad 2," "iPhone 4s," and "iPod Shuffle"). At any point, user 902 can select a product from listing of products 910 to tag the selected product within the communication.

For example, and as shown in FIG. 9B, in response to a selection of a product from listing of products 910, a tag 912 corresponding to the selected product may be inserted into the communication 908. In addition, listing of products 910 is removed from composition area 904 until such time as user 902 requests or begins to input additional text.

In some embodiments, tag 912 can function as a reference to a product node associated with the selected product. For example, tag 912 may link to a product page (e.g., the product page shown in FIG. 8) representing the selected product and a corresponding product node within a social networking system. In additional embodiments, user 902 can use GUI 900 to include any number of additional tags associated with additional products in the communication 908. Once user 902 has completed the communication 908, user 902 can select option 914 to "post" the communication 908 (e.g., to post the message to a user profile associated with user 902). Thereafter, the social networking system can distribute the communication 908 and the included tag 912 to one or more additional users of the social networking system.

Figure 10A:
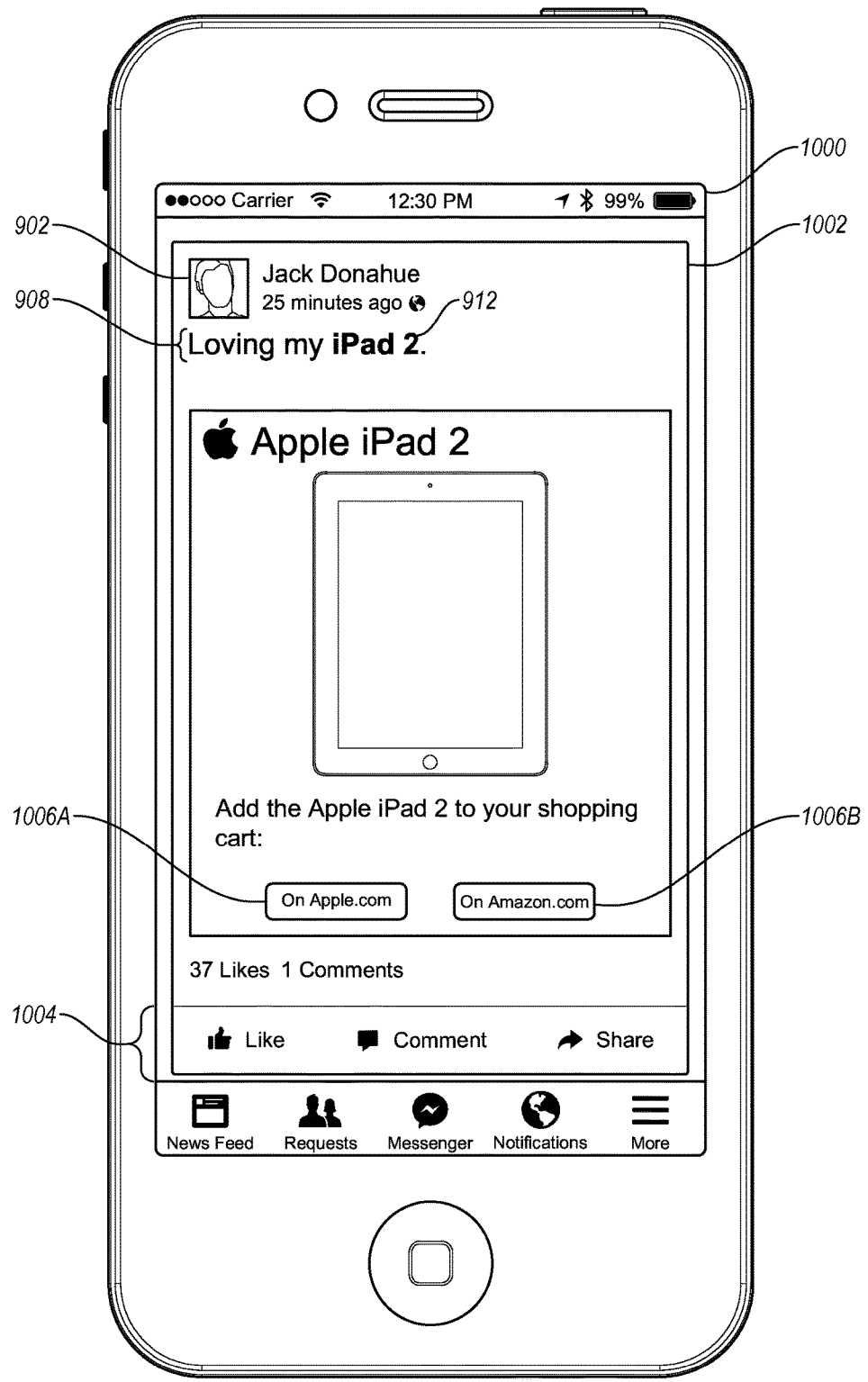
FIGS. 10A-10B include graphical user interfaces illustrating interactions, within an example mobile social networking news feed, with the composed social networking communication of FIGS. 9A-9B in accordance with principles described herein.

To illustrate, FIG. 10A shows an example mobile graphical user interface 1000 (or "GUI 1000") including a news feed for another user of the social networking system (e.g., a "friend" of user 902). As shown, the news feed includes a post 1002 based on the communication 908 composed by user 902. In particular, post 1002 includes the text of communication 908 and tag 912. Post 1002 can further include a plurality of generic options 1004 for interacting with post 1002 (e.g., to "like," share, or comment on post 1002). In addition, and as shown in FIG. 10A, post 1002 can be automatically populated with a variety of information and options associated with the product represented by tag 912. For example, the social networking system can access a product node associated with tag 912 to obtain a name for the product, a description of the product, one or more images associated with the product, and/or any other suitable information associated with the product.

In some embodiments, post 1002 can be automatically populated with one or more options (e.g., user-interface controls) for purchasing the product represented by tag 912. For example, post 1002 includes a first add-to-cart option 1006A associated with a first third-party merchant (i.e., Apple (™)) and a second add-to-cart option 1006B associated with a second third-party merchant (i.e., Amazon (™)). Enablement of add-to-cart options 1006A-1006B within post 1002 can be based on a determination (e.g., by the social networking system) that the user has accounts with each of the represented third-party merchants. For example, social networking system 203 can communicate with the third-party merchants to verify whether the user has accounts with the third-party merchants. To illustrate, social networking system 202 can send an account verification request to the third-party merchants including identification or login information for the user. This account verification process can be streamlined if the user has previously utilized social networking system 202 to log into and/or create an account with one or more of the third-party merchants. As a result, social networking system 202 already has a record of the third-party merchants with which the user has accounts. In addition, enablement of add-to-cart options 1006A-1006B may be further based an availability of the product at the corresponding merchants. For example, the social networking system can receive product availability information from the merchants during setup (e.g., when the merchant initiates sale of the products through the social networking system), through periodic updates received from the merchants, and/or in real-time in response to requests from the social networking system (e.g., the social networking system may send a request to the merchant for updated product availability information in response to the user accessing or experiencing post 1002). Add-to-cart options 1006A-1006B represent examples of controls 246 and 446 as shown in FIGS. 2 and 4, respectively, and discussed in more detail above.

The user of GUI 1000 can use either of add-to-cart options 1006A-1006B to add the product to a corresponding shopping cart without shifting focus away from GUI 1000. For example, in response to a selection of the first add-to-cart option 1006A, a request to add the product to the user's shopping cart can be sent to the corresponding third-party merchant as illustrated in FIGS. 1-5 and as discussed in detail above.

In an additional or alternative embodiment, a "purchase" option can be included in post 1002 to allow the user to purchase the product directly through the social networking system.

Figure 10B:
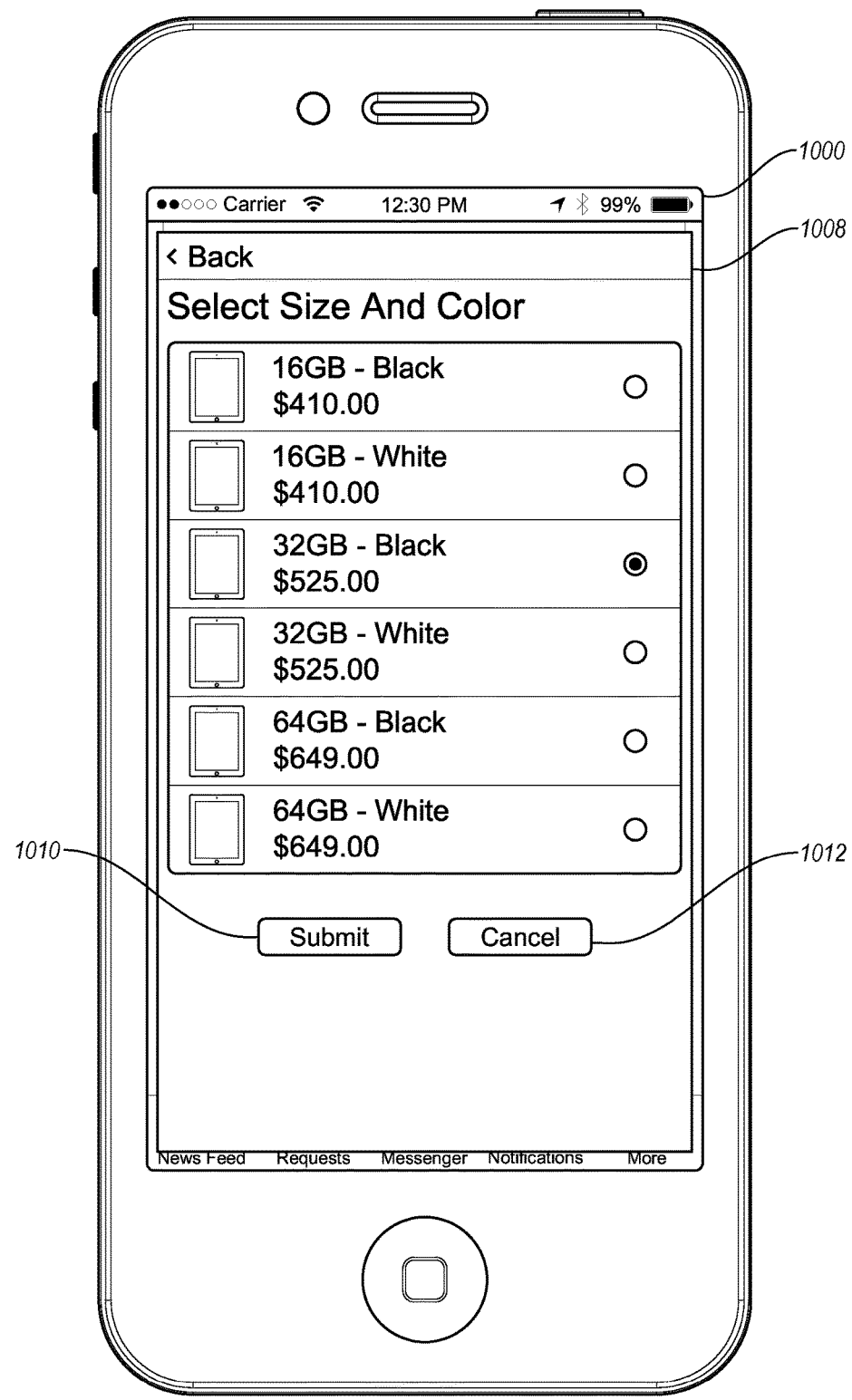

In some embodiments, in response to a selection of one of add-to-cart options 1006A-1006B, the user can be provided with a number of different options associated with the product. Such embodiments are particularly useful if various options associated with the product are available. To illustrate, FIG. 10B shows an options interface 1008 included within GUI 1000 in response to a selection of one of add-to-cart options 1006A-1006B. Using options interface 1008, the user can select one or more options for the product being added to the user's shopping cart. For example, using options interface 1008, the user can specify any one or more of the following for the product: a size, a color, a design, a functionality, a price, etc. After selecting the desired options, the user can select the "submit" option to submit the request to add the product to the user's shopping cart for the third-party merchant. Alternatively, the user can select the "cancel" option 1012 to cancel the request.

Figure 11:
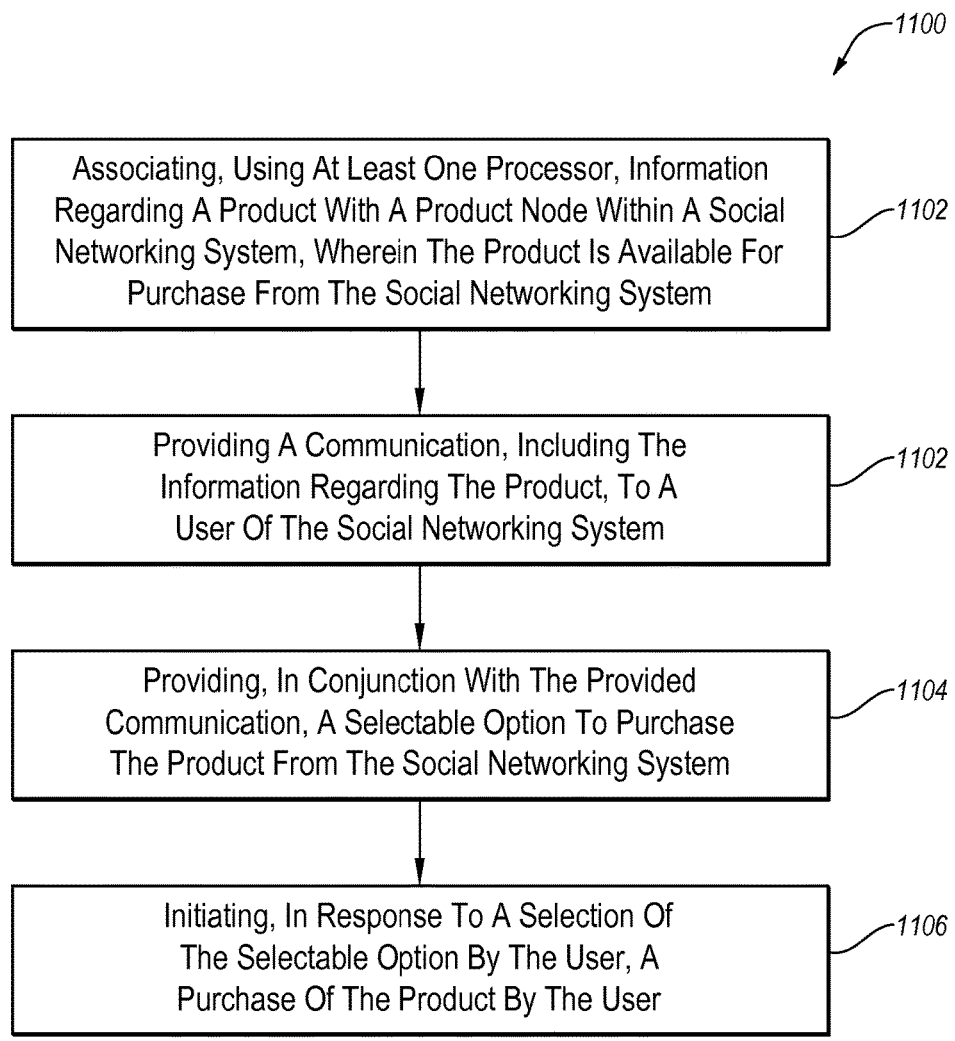
FIG. 11 illustrates a flowchart of a series of acts in a method of purchasing a product from a social networking feed in accordance with principles described herein.
Figure 12:
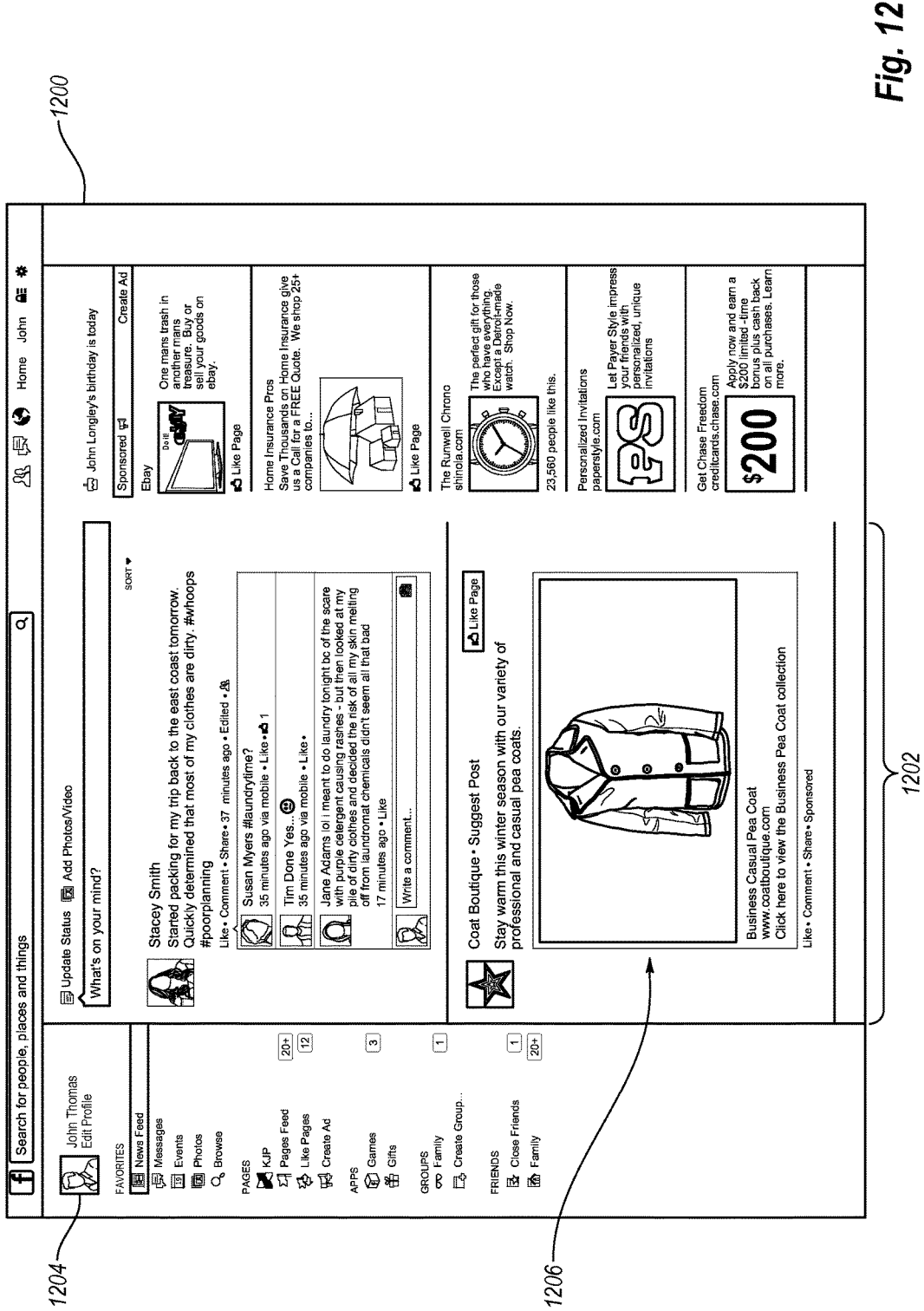
FIG. 12 includes a graphical user interface illustrating an example social networking feed in accordance with principles described herein.

FIG. 11 illustrates a flowchart of an example method 1100 in accordance with an embodiment of the present invention. Method 1100 can be implemented by system 100, system 200, and/or system 400. Method 1100 can allow a user of a social networking system to purchase a product directly from the social networking system. Accordingly, a user of the social networking system can purchase the product without being redirected to a third-party merchant.

Method 1100 includes associating, using at least one processor, information regarding a product with a product node within a social networking system (1101). For example, networking application 101 (as shown in FIG. 1) can associate any suitable product information with a product node within a social networking system, such as described herein. The product represented by the product node may be available for purchase directly from the social networking system. For example, the social networking system can perform one or more actions to initiate the transaction, manage the checkout, handle payment processing and settlement, and/or fulfill the purchase.

Method 1100 further includes providing a communication, including information regarding the product, to a user of the social networking system (1102). The communication can be provided in any suitable manner, such as described herein. For example, the communication can include a social network post or advertisement within a social networking news feed. To illustrate, FIG. 12 includes a social networking graphical user interface 1200 (or "GUI 1200"). GUI 1200 includes a variety of information and options associated with one or more social networking features.

As shown, GUI 1200 includes a news feed 1202 including a plurality of posts relevant to a user 1204 of a social networking system. As shown, news feed 1202 includes a post 1206 associated with a product 1208 available for purchase through the social networking system. Post 1206 includes a variety of information and a plurality of options associated with product 1208. For example, post 1206 includes information regarding a provider/manufacturer of product 1208, a name of product 1208, a description of product 1208, and a website associated with product 1208. In addition, post 1206 includes a plurality of options including an option to "like" a page associated with product 1208, an option to "like" post 1206, an option to share post 1206, and an option to comment on post 1206.

Referring again to FIG. 11, method 1100 includes providing, in conjunction with the provided communication, a selectable option to purchase the product from the social networking system (1104). For example, and as shown in FIGS. 13A-13D, a social networking system can provide an expanded graphical user interface 1300 (or "GUI 1300") including additional information and options associated with product 1208. GUI 1300 can include a window opened within and/or at least partially overlapping GUI 1200.

Figure 13A:
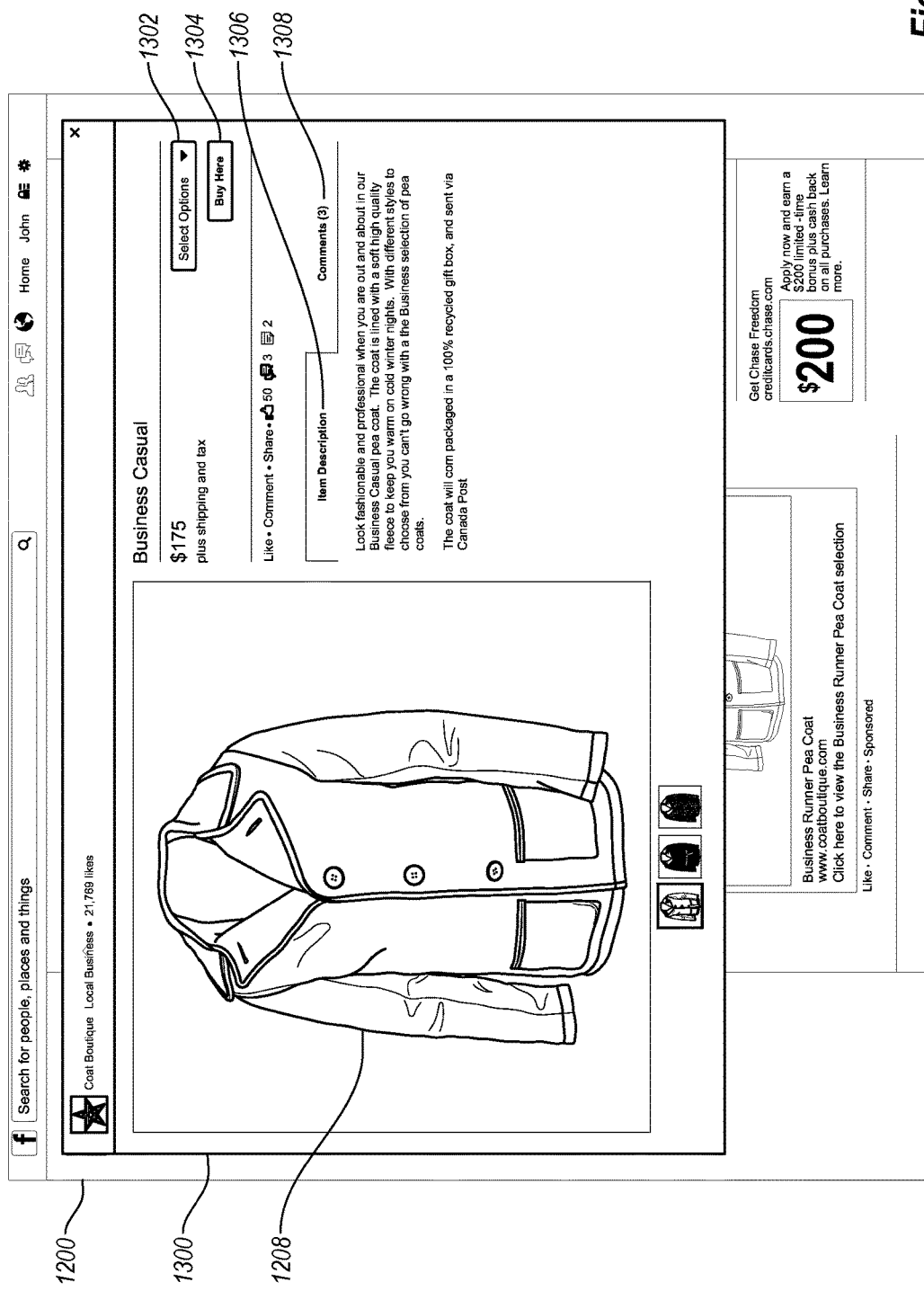
FIGS. 13A-13D include graphical user interfaces illustrating various example interactions with a communication from the social networking feed of FIG. 12 in accordance with principles described herein.
Figure 13B:
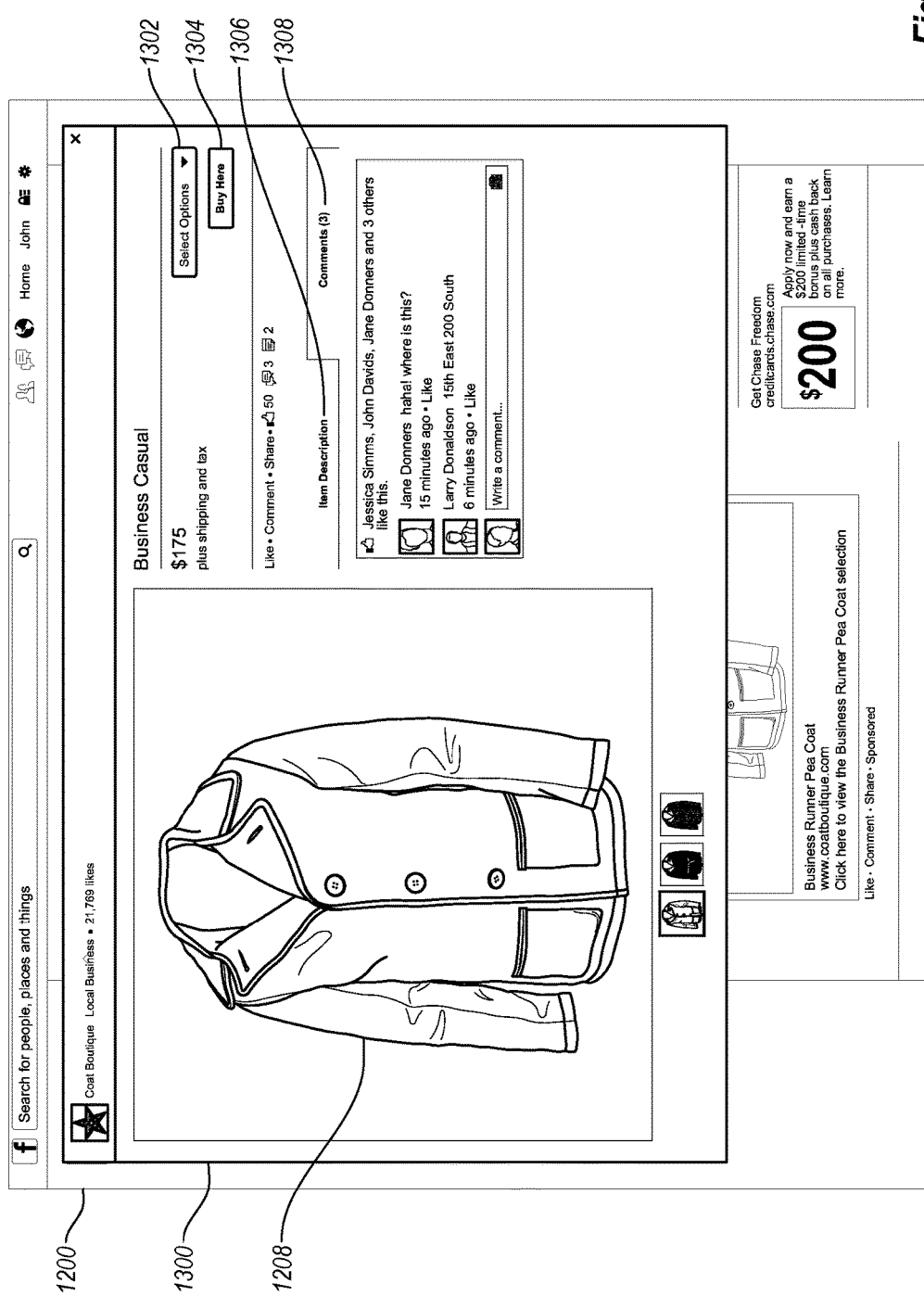

As shown in FIG. 13A, GUI 1300 includes a variety of content and information associated with product 1208, including a plurality of images of product 1208, an item description for product 1208, a price for product 1208, comments for product 1208, etc. Furthermore, GUI 1300 includes an option to "like" product 1208, an option to comment on product 1208, an option to share product 1208, etc. In addition, a dropdown for specifying which type of product 1208 the user wishes to buy, and a "purchase" option 1304 to initiate a purchase of product 1208. Additionally or alternatively, GUI 1300 can include a first selectable tab 1306 for accessing an item description associated with product 1208 and a second selectable tab 1308 for accessing comments associated with product 1208. For example, and as shown in FIG. 13B, in response to a user selection of second selectable tab 1308, the comments associated with product 1208 are shown within GUI 1300.

Figure 13C:
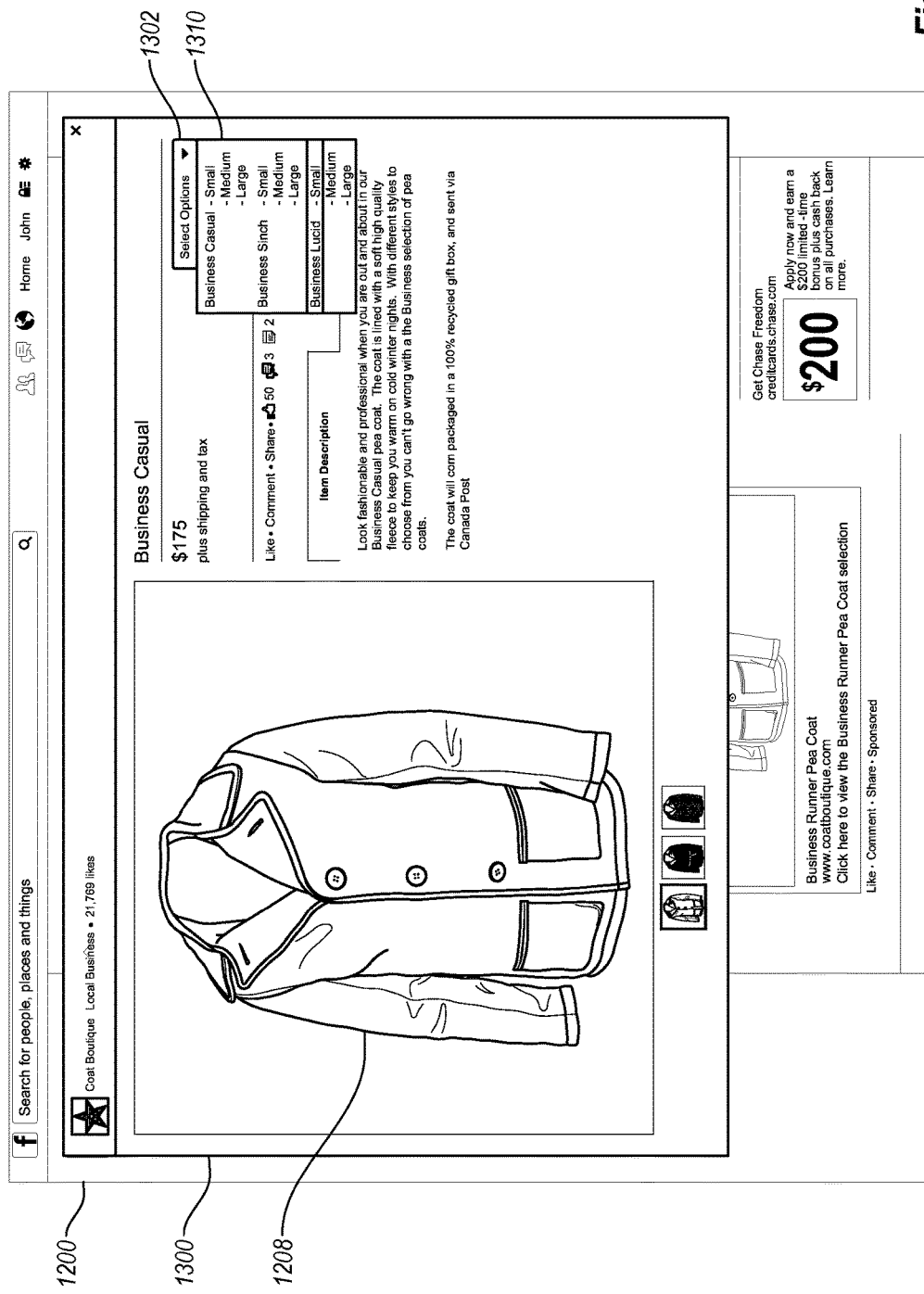
Figure 13D:
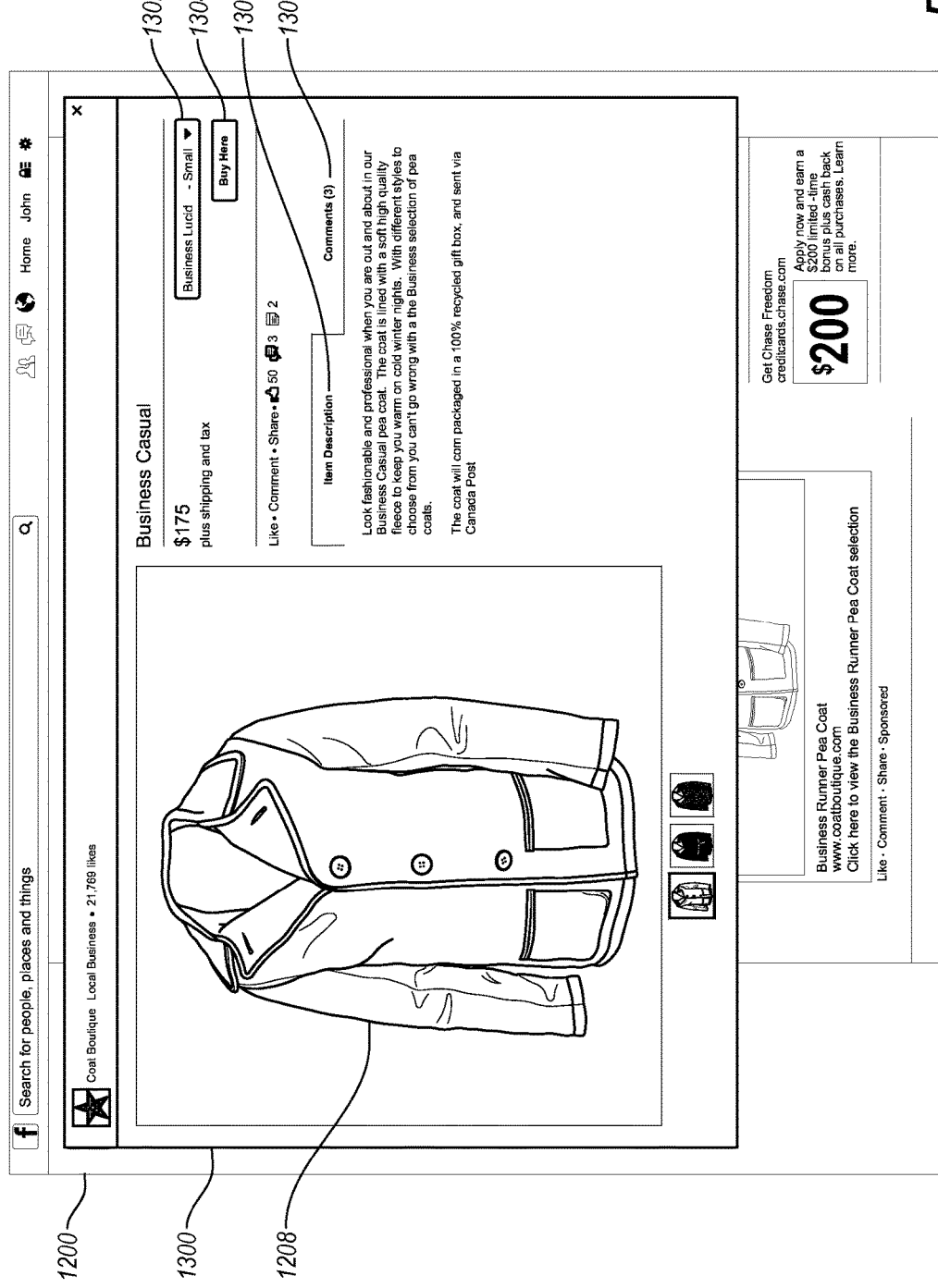

As shown in FIG. 13C, in response to a user selection of dropdown 1302, dropdown 1302 is opened to reveal a listing 1310 of available options for product 1208. For example, listing 1310 includes options regarding sizes and styles for product 1208. Once the user selects an available option from listing 1310, listing 1310 can be closed, and dropdown 1302 can reveal the selected option (i.e., "Business Lucid—Small"), as shown in FIG. 13D.

Referring again to FIG. 11, method 1100 includes initiating, in response to a selection of the selectable option by the user, a purchase of the product by the user (1106). To illustrate, and as shown in FIG. 13D, user can select option 1304 to initiate the purchase of product 1208.

Additionally or alternatively, social networking system can provide one or more user interfaces and corresponding options to complete a checkout process (e.g., to identify shipping and payment information for the purchase) and finalize the purchase.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In certain particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Figure 14:
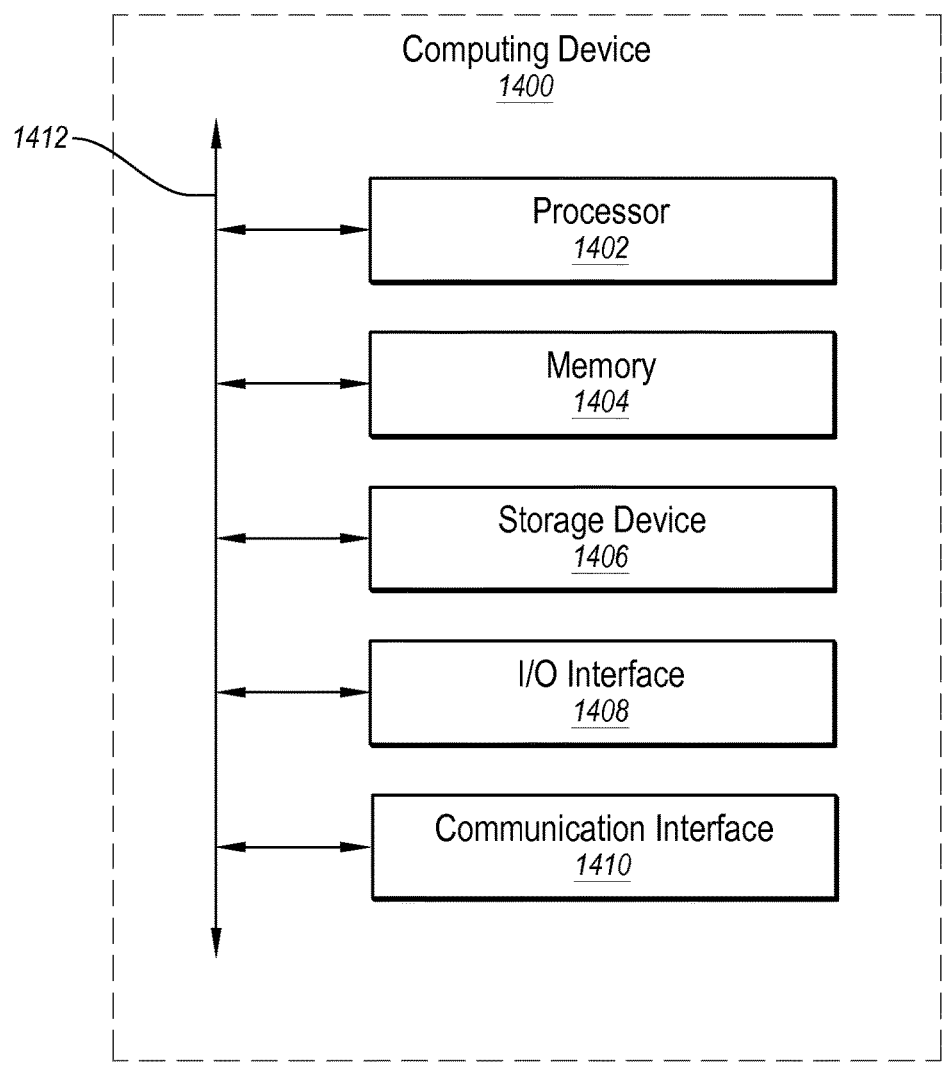
FIG. 14 illustrates a block diagram of an exemplary computing device in accordance with principles described herein.

FIG. 14 illustrates, in block diagram form, an exemplary computing device 1400 that may be configured to perform one or more of the processes described above. One will appreciate that the described computing devices can each comprise implementations of the data-computing device 1400. As shown by FIG. 14, the computing device can comprise a processor 1402, memory 1404, a storage device 1406, an I/O interface 1408, and a communication interface 1410. While an exemplary computing device 1400 is shown in FIG. 14, the components illustrated in FIG. 14 are not intended to be limiting. Additional or alternative components may be used in other embodiments. Furthermore, in certain embodiments, a computing device 1400 can include fewer components than those shown in FIG. 14. Components of computing device 1400 shown in FIG. 14 will now be described in additional detail.

In particular embodiments, processor(s) 1402 includes hardware for executing instructions, such as those making up a computer program. As an example and not by way of limitation, to execute instructions, processor(s) 1402 may retrieve (or fetch) the instructions from an internal register, an internal cache, memory 1404, or a storage device 1406 and decode and execute them. In particular embodiments, processor(s) 1402 may include one or more internal caches for data, instructions, or addresses. As an example and not by way of limitation, processor(s) 1402 may include one or more instruction caches, one or more data caches, and one or more translation lookaside buffers (TLBs). Instructions in the instruction caches may be copies of instructions in memory 1404 or storage 1406.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example and not by way of limitation, storage device 1406 can comprise a non-transitory storage medium described above. The storage device 1406 may include a hard disk drive (HDD), a floppy disk drive, flash memory, an optical disc, a magneto-optical disc, magnetic tape, or a Universal Serial Bus (USB) drive or a combination of two or more of these. Storage device 1406 may include removable or non-removable (or fixed) media, where appropriate. Storage device 1406 may be internal or external to the computing device 1400. In particular embodiments, storage device 1406 is non-volatile, solid-state memory. In particular embodiments, Storage device 1406 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1400 also includes one or more input or output ("I/O") devices/interfaces 1408, which are provided to allow a user to provide input to, receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a stylus or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1410. As an example and not by way of limitation, computing device 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1400 may include any suitable communication interface 1410 for any of these networks, where appropriate.

The computing device 1400 can further include a bus 1412. The bus 1412 can comprise hardware, software, or both that couples components of computing device 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, embodiments of the present invention may be implemented by a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 15:
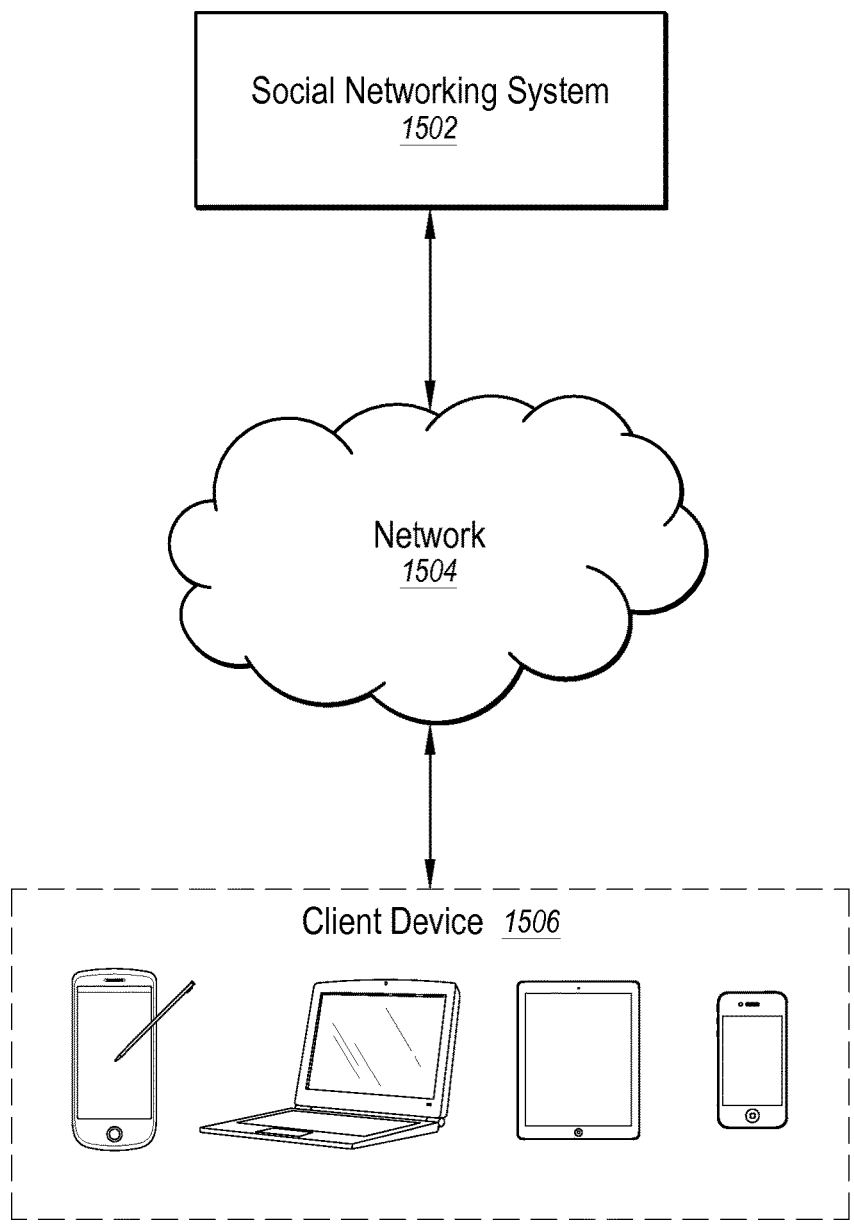
FIG. 15 is an example network environment of a social networking system in accordance in accordance with principles described herein.

FIG. 15 illustrates an example network environment of a social-networking system. In particular embodiments, a social-networking system 1500 may comprise one or more data stores. In particular embodiments, the social-networking system 1500 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1500 may comprise one or more computing devices (e.g., servers) hosting functionality directed to operation of the social-networking system. A user of the social-networking system 1500 may access the social-networking system 1500 using a client device such as client device 1506. In particular embodiments, the client device 1506 can interact with the social-networking system 1502 through a network 1504.

The client device 1506 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 1506 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 1504.

Network 1504 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1506 may access the social-networking system 1500.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
   obtaining, by a social networking system comprising at least one computing device, product data for a product available for purchase via the social networking system;
   creating, using the product data, a product node in a social graph of the social networking system, the social graph comprising a plurality of nodes and a plurality of edges representing relationships between the plurality of nodes, wherein the plurality of edges comprises one or more edges connecting the product node to one or more other nodes;

inserting, by the social networking system, a tag of the product within a communication in response to a user input to insert the tag from a client device of a user composing the communication, the tag referencing the product node in the social graph;

obtaining, by the social networking system, information about the product from the product node;

based on the tag, and in response to the tag being inserted into the communication, modifying, by the social networking system, the communication to populate the communication with:

the information about the product from the product node; and a selectable option to initiate a transaction for the product; and providing, by the social networking system, the communication with the information from the product node and the selectable option to initiate the transaction for the product to a user of the social networking system.

2. The method as recited in claim 1, further comprising:

receiving, from a computing device composing the communication, information indicating the product within the communication;

accessing the product node based on the information indicating the product within the communication; and providing, to the computing device composing the communication, at least a portion of the product data in the product node.

3. The method as recited in claim 1, wherein providing the communication comprises providing the communication within a news feed associated with the user.

4. The method as recited in claim 1, further comprising:

providing, to a client device composing the communication, a listing of products matching at least a portion of text in the communication; and wherein inserting the tag of the product comprises receiving a selection of the product from the listing of products matching at least a portion of text in the communication.

5. The method as recited in claim 1, further comprising:

receiving, from a computing device of the user of the social networking system, an indication of a selection of the selectable option within the communication to initiate the transaction for the product; and initiating a purchase of the product by initiating a checkout procedure for the product.

6. The method as recited in claim 5, wherein initiating the checkout procedure for the product comprises accessing, from a user node in the social graph of the social networking system, at least one of payment information and shipping information associated with the user.

7. The method as recited in claim 6, further comprising facilitating fulfillment of the purchase after the checkout procedure.

8. The method as recited in claim 1, wherein providing the communication comprises providing the communication by way of a user interface displayed by a computing device associated with the user.

9. The method as recited in claim 8, wherein the computing device associated with the user comprises a mobile device.

10. The method of claim 1, further comprising generating the communication based on a user action associated with another user of the social networking system.

11. The method of claim 10, wherein the user action comprises a composition of the communication.

12. The method of claim 10, wherein the user action comprises an indication that the other user of the social networking system likes the product via the social networking system.

13. The method of claim 10, wherein the other user is connected to the user by way of the social networking system.

14. The method of claim 10, wherein the other user is a third-party merchant associated with the product.

15. The method of claim 1, further comprising providing, to the user in response to a selection to purchase the product, a listing of a plurality of options associated with the product.

16. The method of claim 1, wherein inserting the tag of the product within the communication comprises:

receiving an indication of the product within a communication composed by a user of the social networking system;

tagging, by the social networking system and based on the received indication of the product, the product within the communication by associating the product node with the communication composed by the user; and including the information from the product node in the communication based on the association between the product node and the communication according to the received tag for presentation to other users of the social networking system associated with the user that composed the communication.

17. A system comprising: one or more server devices storing instructions thereon that, when executed by at least one processor, cause the system to:

obtain, by a social networking system, product data representing product information for a product available for purchase via the social networking system;

create, using the product data, a product node in a social graph of the social networking system, the social graph comprising a plurality of nodes and a plurality of edges representing relationships between the plurality of nodes, wherein the plurality of edges comprise one or more edges connecting the product node to one or more other nodes;

receive, by the social networking system, an indication of the product within a communication composed by a first user;

tag, by the social network and based on the received indication of the product, the product within the communication by associating the product node with the communication composed by the first user;

obtain, by the social networking system, information about the product from the product node;

modify, by the social networking system in response to the tag being inserted into the communication and based on the association between the product node and the communication according to the tag within the communication, the communication to populate the communication for presentation to one or more users of the social networking system with:

the information about the product from the product node; and a selectable option to initiate a transaction for the product; and provide, by the social networking system, the communication including the information from the product node and the selectable option to initiate the transaction for the product to a second user of the social networking system.

18. The system as recited in claim 17, wherein the instructions, when executed by the at least one processor, further cause the system to:
   receive, from a computing device composing the communication, text indicating the product within the communication;
   access the product node based on the text indicating the product within the communication; and
   provide, to the computing device composing the communication, at least a portion of the product data in the product node.

19. The system as recited in claim 18, wherein the instructions, when executed by the at least one processor, further cause the system to determine that the received text matches at least a portion of a name of the product in the product node.

20. The system as recited in claim 17, wherein the instructions, when executed by the at least one processor, further cause the system to generate the communication based on a user action associated with another user of the social networking system.

* * * * *